US011930311B2

(12) United States Patent
Takahashi et al.

(10) Patent No.: US 11,930,311 B2
(45) Date of Patent: Mar. 12, 2024

(54) SOUND OUTPUT APPARATUS AND OSCILLATION PROVISING MECHANISM

(71) Applicant: SONY GROUP CORPORATION, Tokyo (JP)

(72) Inventors: Masahiro Takahashi, Tokyo (JP); Takanobu Wada, Tokyo (JP); Tetsuya Minakawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/756,603

(22) PCT Filed: Dec. 2, 2020

(86) PCT No.: PCT/JP2020/044854
§ 371 (c)(1),
(2) Date: May 27, 2022

(87) PCT Pub. No.: WO2021/117575
PCT Pub. Date: Jun. 17, 2021

(65) Prior Publication Data
US 2022/0417629 A1     Dec. 29, 2022

(30) Foreign Application Priority Data
Dec. 10, 2019    (JP) ................. 2019-222812

(51) Int. Cl.
*H04R 1/26*     (2006.01)
*G06F 1/16*     (2006.01)
(Continued)

(52) U.S. Cl.
CPC .......... *H04R 1/026* (2013.01); *G06F 1/1605* (2013.01); *H04R 1/26* (2013.01); *H04R 7/04* (2013.01);
(Continued)

(58) Field of Classification Search
CPC . H04R 1/26; H04R 1/026; H04R 7/04; H04R 17/00; H04R 2499/15
See application file for complete search history.

(56) References Cited

U.S. PATENT DOCUMENTS 6,332,029 B1 * 12/2001 Azima ................. H04R 1/021
381/337
2007/0121992 A1   5/2007 Nakagawa
(Continued)

FOREIGN PATENT DOCUMENTS

| CN | 105191349 A | 12/2015 |
| CN | 109389917 A | 2/2019 |

(Continued)

OTHER PUBLICATIONS

International Search Report and Written Opinion of PCT Application No. PCT/JP2020/044854, dated Mar. 2, 2021, 10 pages of ISRWO.

Primary Examiner — Suhan Ni
(74) Attorney, Agent, or Firm — CHIP LAW GROUP

(57) ABSTRACT

Provided is a sound output apparatus including a functional mechanism that performs a specified function; an oscillation providing mechanism that oscillates, as an oscillation-provision-target member, a member included in the functional mechanism; and an oscillation controller that controls an oscillation operation performed by the oscillation providing mechanism, on the basis of sound information. The oscillation providing mechanism includes an actuator, a support member, and a biasing member. The actuator generates oscillation along a specified oscillation axis, and includes a rear end that is situated opposite to the oscillation-provision-target member in an axial direction of the oscillation axis. The biasing member is provided around the support member as viewed along the oscillation axis and of which at least a portion is arranged closer to the oscillation-provision-target (Continued)

member than the rear end of the actuator in the axial direction of the oscillation axis, the biasing member biasing the support member toward the oscillation-provision-target member.

14 Claims, 21 Drawing Sheets

(51) Int. Cl.
    *H04R 1/02*     (2006.01)
    *H04R 7/04*     (2006.01)
    *H04R 17/00*     (2006.01)

(52) U.S. Cl.
    CPC ......... *H04R 17/00* (2013.01); *H04R 2499/15* (2013.01)

(56) References Cited

U.S. PATENT DOCUMENTS

| | | |
|---|---|---|
| 2011/0133606 A1 | 6/2011 | Yoshida |
| 2016/0105740 A1 | 4/2016 | Suzuki et al. |
| 2019/0050024 A1 | 2/2019 | Ahn et al. |
| 2019/0313194 A1 | 10/2019 | Landick |

FOREIGN PATENT DOCUMENTS

| | | |
|---|---|---|
| EP | 2999238 A1 | 3/2016 |
| EP | 3442243 A1 | 2/2019 |
| JP | 4655243 B2 | 3/2011 |
| JP | 2017-034345 A | 2/2017 |
| JP | 6237768 B2 | 11/2017 |
| KR | 10-2019-0018084 A | 2/2019 |
| WO | 2014/184994 A1 | 11/2014 |

* cited by examiner

FIG. 6A
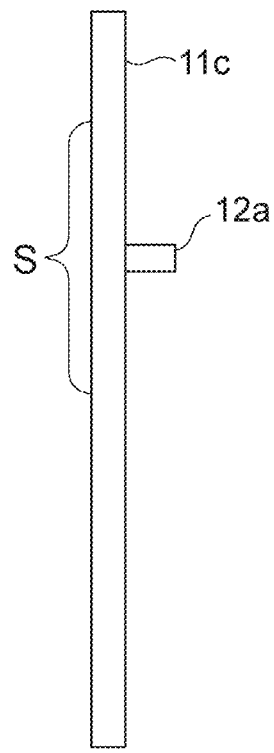
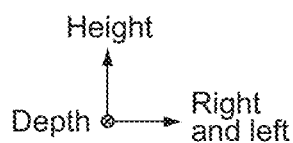
FIG. 6B
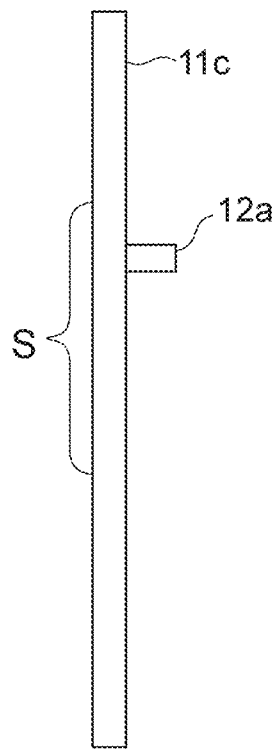
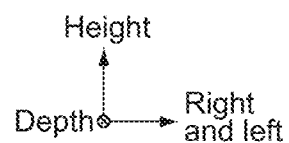
FIG. 6C
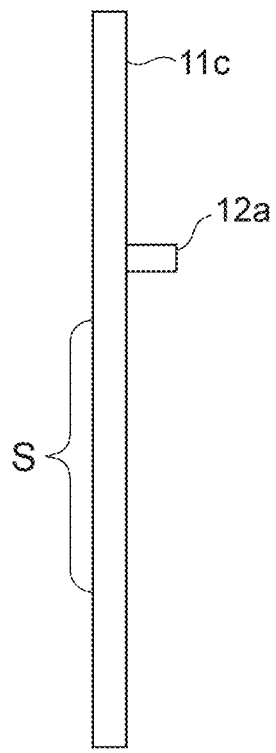
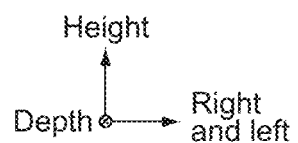

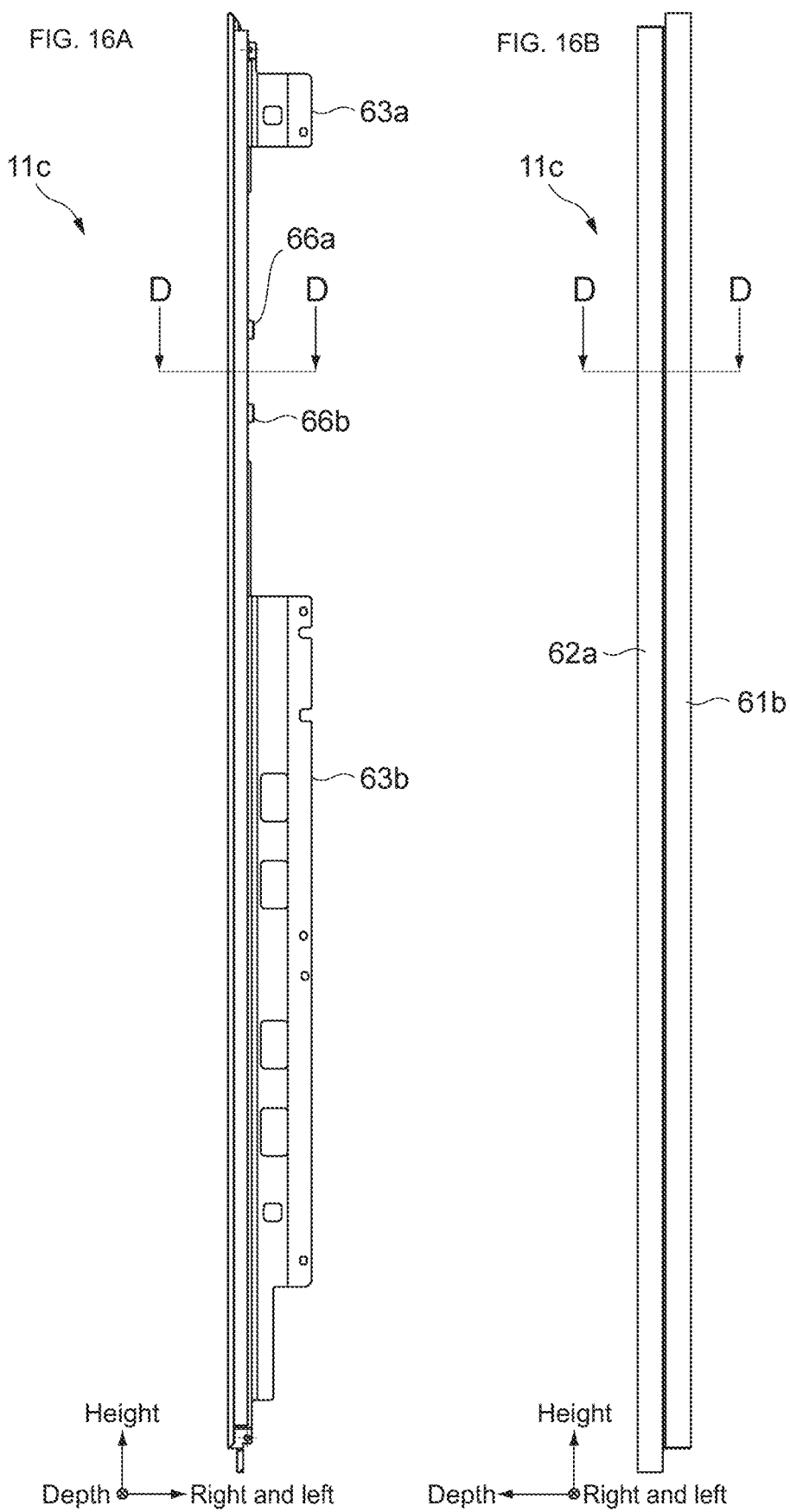

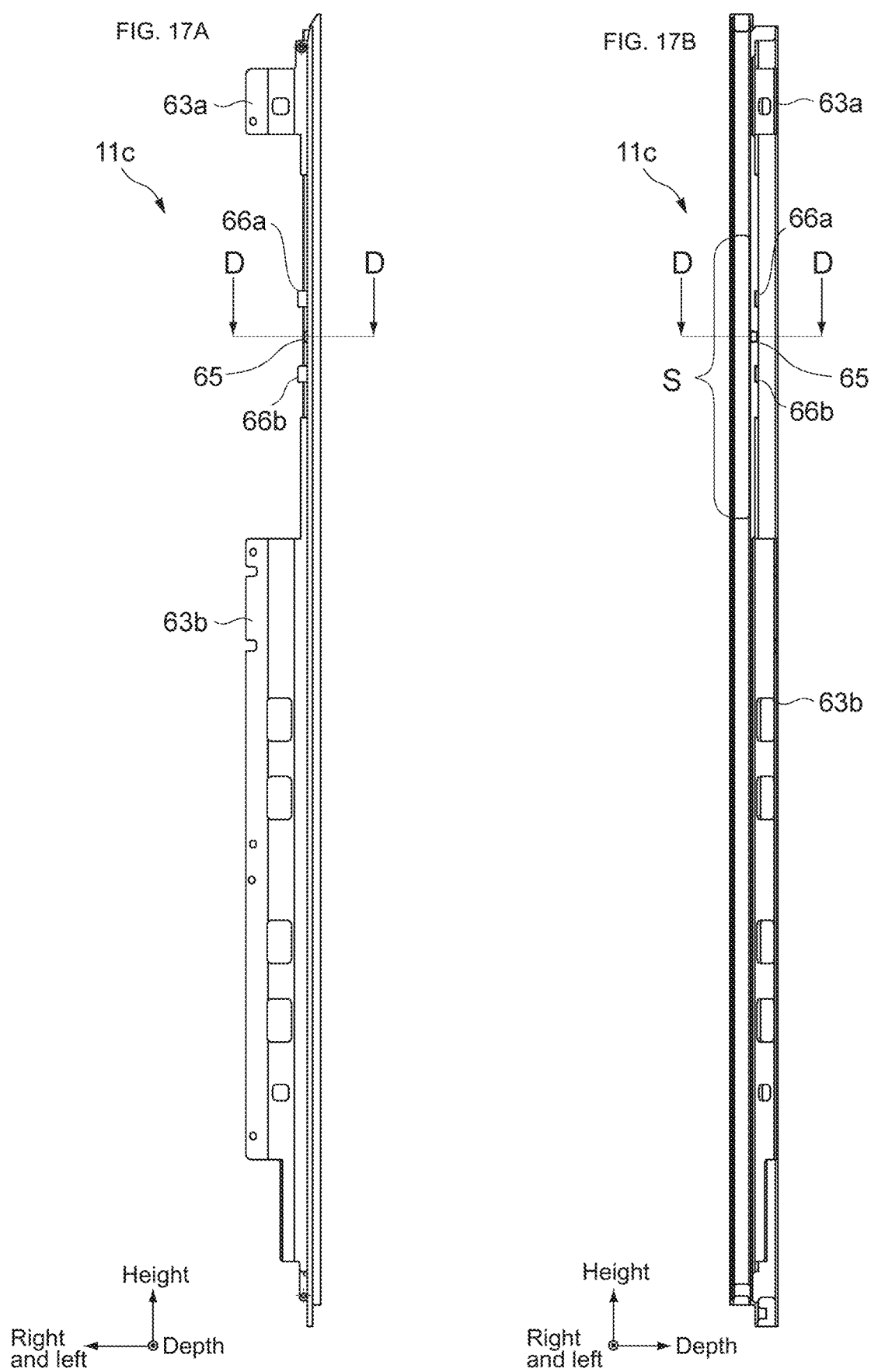

SOUND OUTPUT APPARATUS AND OSCILLATION PROVISING MECHANISM

CROSS REFERENCE TO RELATED APPLICATIONS

This application is a U.S. National Phase of International Patent Application No. PCT/JP2020/044854 filed on Dec. 2, 2020, which claims priority benefit of Japanese Patent Application No. JP 2019-222812 filed in the Japan Patent Office on Dec. 10, 2019. Each of the above-referenced applications is hereby incorporated herein by reference in its entirety.

TECHNICAL FIELD

The present technology relates to a sound output apparatus that can output sound, and an oscillation providing mechanism that is used to output sound.

BACKGROUND ART

In the speaker system disclosed in Patent Literature 1, an actuator is attached to a frame member or a front panel that is connected to a display panel. The actuator is attached such that the actuator is displaced (oscillates) in a direction parallel to a planar direction of a screen of the display panel. This makes it possible to make a thickness of the display panel sufficiently small (for example, paragraphs [0032] to [0036], [0051], and [0052] of the specification, and FIG. 1 in Patent Literature 1).

In the sound output apparatus disclosed in Patent Literature 2, a bezel in the form of a frame plate (in the form of a picture frame) is attached to a peripheral portion of a display panel as an acoustic diaphragm. A protrusion is formed on the bezel, and a holder that holds an actuator is attached to the bezel such that the actuator is brought into contact with the protrusion. This enables the sound output apparatus to have an excellent design and provide high-quality sound at the same time (for example, paragraphs [0015], [0051] to [0057], and [0097], and FIGS. 4A, 4B, and 4C in Patent Literature 2).

CITATION LIST

Patent Literature

Patent Literature 1: Japanese Patent No. 4655243
Patent Literature 2: Japanese Patent No. 6237768

DISCLOSURE OF INVENTION

Technical Problem

With respect to sound output apparatuses such as TV apparatuses, there is a need for a technology that makes it possible to make the apparatus thinner and smaller, and to provide a space with high-quality sound, as described above.

In view of the circumstances described above, it is an object of the present technology to provide a sound output apparatus and an oscillation providing mechanism that make it possible to make the apparatus thinner and smaller, and to provide a space with high-quality sound.

Solution to Problem

In order to achieve the object described above, a sound output apparatus according to an embodiment of the present technology includes a functional mechanism, an oscillation providing mechanism, and an oscillation controller.

The functional mechanism performs a specified function.

The oscillation providing mechanism oscillates, as an oscillation-provision-target member, a member that is included in the functional mechanism.

The oscillation controller controls an oscillation operation performed by the oscillation providing mechanism, on the basis of sound information.

Further, the oscillation providing mechanism includes an actuator, a support member, and a biasing member.

The actuator generates oscillation along a specified oscillation axis, and includes a rear end that is situated opposite to the oscillation-provision-target member in an axial direction of the oscillation axis.

The instruction member supports the actuator.

The biasing member is provided around the support member as viewed along the oscillation axis and of which at least a portion is arranged closer to the oscillation-provision-target member than the rear end of the actuator in the axial direction of the oscillation axis, the biasing member biasing the support member toward the oscillation-provision-target member.

Furthermore, the oscillation-provision-target member includes a sound output region being configured to have a relatively small thickness.

In the sound output apparatus, a member that is included in the functional mechanism performing an image display function is oscillated by the oscillation providing mechanism as the oscillation-provision-target member. The oscillation providing mechanism includes the support member supporting the actuator. The support member is biased by the biasing member provided around the support member toward the oscillation-provision-target member. Further, the oscillation-provision-target member includes the sound output region configured to have a relatively small thickness. Such a configuration makes it possible to make the apparatus thinner and smaller, and to provide a space with high-quality sound.

The entirety of the biasing member may be arranged closer to the oscillation-provision-target member than the rear end of the actuator in the axial direction of the oscillation axis.

The functional mechanism may be capable of performing an image display function, and may include a display panel and a frame that supports the display panel. In this case, the oscillation-provision-target member may be the frame included in the functional mechanism.

The frame may have a shape that extends in a certain direction, and a region that has a specified length in the direction of the extension may be configured as the sound output region.

The sound output region may be configured to include, in the direction of the extension of the frame, a location at which oscillation is provided by the oscillation providing mechanism.

The oscillation-provision-target members may be a left frame and a right frame, the left frame supporting a left edge of the display panel when the display panel is viewed from the front, the right frame supporting a right edge of the display panel when the display panel is viewed from the front.

The functional mechanism may include a back chassis, and the oscillation providing mechanism may be fixed to the back chassis.

The oscillation-provision-target member may be a member that is indispensable when the functional mechanism performs the specified function.

The oscillation providing mechanism may include a contact member that is connected to the actuator, and is brought into contact with the oscillation-provision-target member.

The oscillation providing mechanism may include a fixation member that is used to fix the support member to the functional mechanism.

The biasing member may be a coil spring that is arranged around the support member.

The actuator may include a piezoelectric element or a dielectric elastomer.

The support member may be hollow, and may accommodate therein the actuator.

The support member may be a die-cast member or a press member.

An oscillation providing mechanism according to an embodiment of the present technology is an oscillation providing mechanism that oscillates an oscillation-provision-target member and includes the actuator, the support member, and the biasing member.

BRIEF DESCRIPTION OF DRAWINGS

FIGS. 6A, 6B, and 6C schematically illustrate a left frame and the oscillation providing mechanism.

FIGS. 16A and 16B schematically illustrate a specific example of a configuration of the left frame.

FIGS. 17A and 17B schematically illustrate the specific example of the configuration of the left frame.

MODE(S) FOR CARRYING OUT THE INVENTION

Embodiments according to the present technology will now be described below with reference to the drawings.

[Image Display Apparatus]

Figure 1:
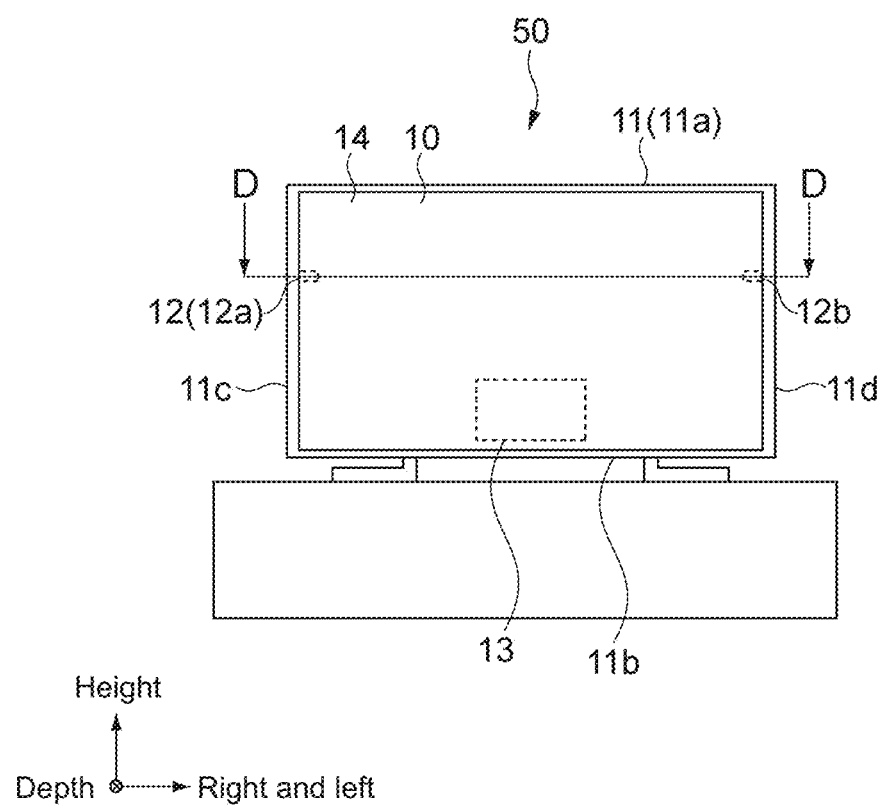
FIG. 1 schematically illustrates an example of an image display apparatus according to an embodiment of the present technology.

FIG. 1 schematically illustrates an example of an image display apparatus according to an embodiment of the present technology.

An image display apparatus 50 corresponds to an embodiment of a sound output apparatus according to the present technology.

Further, the image display apparatus 50 can also correspond to an embodiment of an electronic apparatus that can output sound.

Examples of the image display apparatus 50 include a TV apparatus that causes an image based on television broadcasts to be displayed. Of course, the present technology can also be applied to other image display apparatuses.

The image display apparatus 50 can be used as a wall-hung apparatus that is used by being hung on the wall, in addition to being used as a stationary apparatus that is placed on a level surface of, for example a floor, a shelf, or a table.

As illustrated in FIG. 1, a right-and-left direction, an up-and-down direction, and a depth direction when the image display apparatus 50 is viewed from the front are defined. Of course, an orientation of the image display apparatus 50 when the image display apparatus 50 is used, and a direction in which the image display apparatus 50 is used are not limited.

The image display apparatus 50 includes a display panel 10, a frame 11, two oscillation providing mechanisms 12 (12a, 12b), and a controller 13.

The display panel 10 can display an image on a display surface 14.

Any type of display panel such as a liquid crystal panel or an organic EL panel can be used as the display panel 10.

The frame 11 supports a peripheral portion of the display panel 10.

In the present embodiment, an upper frame 11a, a lower frame 11b, a left frame 11c, and a right frame 11d that respectively support an upper edge, a lower edge, a left edge, and a right edge of the display panel 10 when the display panel 10 is viewed from the front, are provided.

The upper frame 11a, the lower frame 11b, the left frame 11c, and the right frame 11d may be separate from each other, or may be integrally formed into the surrounding frame 11. When the surrounding frame 11 is used, an upper portion, a lower portion, a left portion, and a right portion of the surrounding frame 11 respectively correspond to the upper frame 11a, the lower frame 11b, the left frame 11c, and the right frame 11d.

The frame 11 is made of a metal material such as aluminum. The material of the frame 11 is not limited thereto, and any other material may be used.

Typically, the oscillation providing mechanism 12 is arranged within the image display apparatus 50, and can oscillate, as an oscillation-provision-target member, a member that is included in the image display apparatus 50.

In the present embodiment, the left frame 11c and the right frame 11d are set as oscillation-provision-target members.

The left frame 11c is oscillated by the oscillation providing mechanism 12a, and the right frame 11d is oscillated by the oscillation providing mechanism 12b.

As illustrated in FIG. 1, the oscillation providing mechanism 12a on the left and the oscillation providing mechanism 12b on the right are arranged at the same level (at the same height) as each other in the up-and-down direction. In other words, portions of the left frame 11c and the right frame 11d that are situated at the same height as each other are respectively oscillated by the oscillation providing mechanism 12a and the oscillation providing mechanism 12b.

A location at which the oscillation providing mechanism 12 is arranged, that is, a location of a point to which oscillation is provided by the oscillation providing mechanism 12 is not limited. Designing may be performed as appropriate such that a space with desired sound can be provided. For example, the oscillation providing mechanism 12a on the left and the oscillation providing mechanism 12b on the right can be arranged at heights that are different from each other.

The controller 13 can perform an overall control on an operation of the image display apparatus 50.

The controller 13 includes hardware, such as a processor such as a CPU, a GPU, and a DSP; a memory such as a ROM and a RAM; and a storage device such as an HDD, that is necessary for a configuration of a computer. For example, a sound output method according to the present technology is performed by, for example, the CPU loading, into the RAM, a program according to the present technology that is recorded in, for example, the ROM in advance and executing the program.

A configuration of the controller 13 is not limited, and any hardware and any software may be used. Of course, hardware such as an FPGA or an ASIC may be used. Further, a location at which the controller 13 is implemented is also not limited, and designing may be performed discretionarily.

In the present embodiment, an oscillation controller is implemented as a functional block by the CPU executing a specified program. Of course, dedicated hardware such as an integrated circuit (IC) may be used in order to implement the functional blocks.

The program is installed on the image display apparatus 50 through, for example, various recording media. Alternatively, the installation of the program may be performed via, for example, the Internet.

The type and the like of a recording medium that records therein a program are not limited, and any computer-readable recording medium may be used. For example, any non-transitory computer-readable recording medium may be used.

The oscillation controller can control oscillation operations performed by the oscillation providing mechanisms 12a and 12b, on the basis of sound information. This enables sounds to be directly output from the left frame 11c and the right frame 11d of the image display apparatus 50. In other words, it is possible to cause the left frame 11c and the right frame 11d to serve as speakers.

[Oscillation Providing Mechanism]

Figure 2A:
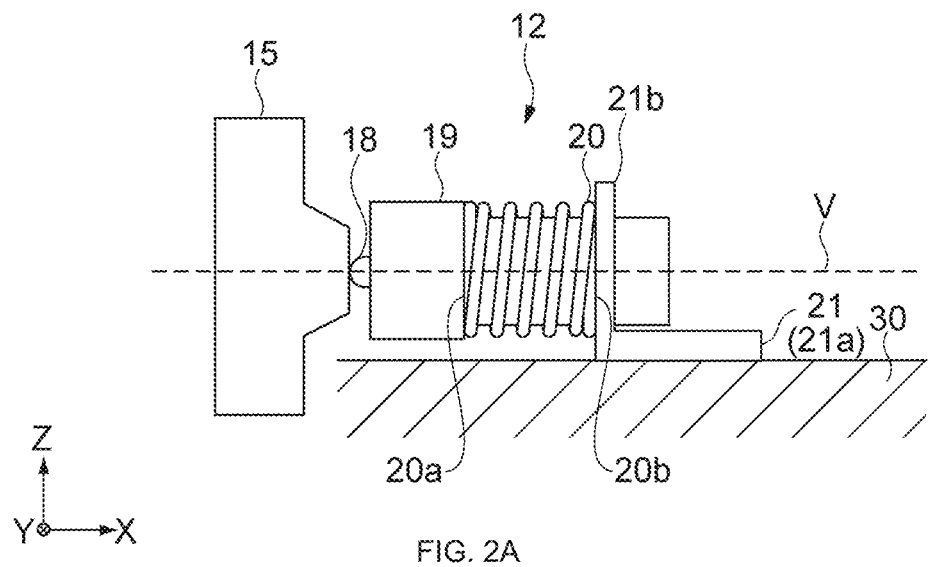
FIGS. 2A and 2B schematically illustrate an example of a configuration of an oscillation providing mechanism.
Figure 2B:
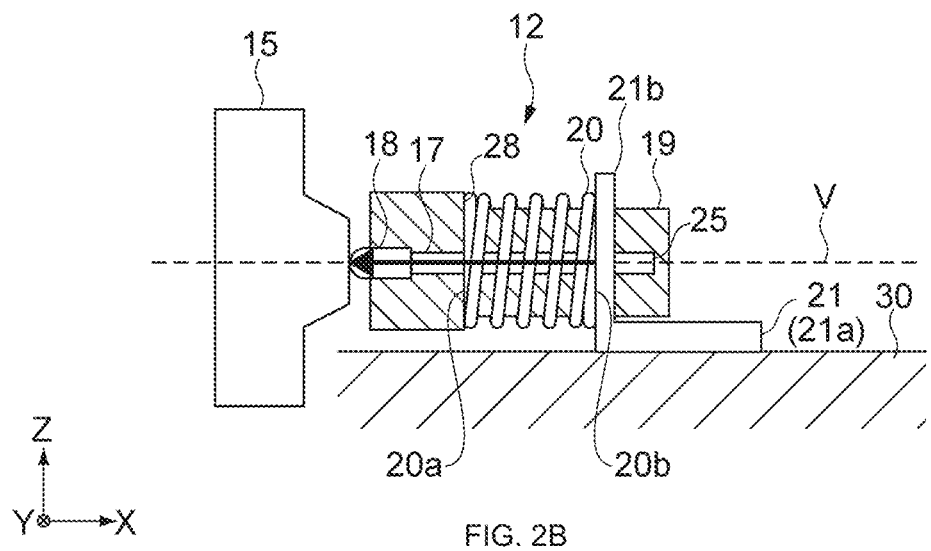

FIGS. 2A and 2B schematically illustrate an example of a configuration of the oscillation providing mechanism 12.

The oscillation providing mechanism 12 can generate oscillation along an oscillation axis V to oscillate an oscillation-provision-target member 15. In the present embodiment, the oscillation axis V corresponds to a specified oscillation axis.

Here, a side of the oscillation providing mechanism 12 that faces the oscillation-provision-target member 15 is defined as a front side of the oscillation providing mechanism 12. Further, the direction is defined as indicated below.

A front-rear direction of the oscillation providing mechanism 12 (an X direction): an axial direction of the oscillation axis V.

A right-and-left direction of the oscillation providing mechanism 12 (a Y direction): a direction that is orthogonal to the axial direction of the oscillation axis V, and corresponds to a right-and-left direction when the front side of the oscillation providing mechanism 12 is viewed from the axial direction of the oscillation axis V.

An up-and-down direction of the oscillation providing mechanism 12 (a Z direction): a direction that is orthogonal to the axial direction of the oscillation axis V, and corresponds to an up-and-down direction when the front side of the oscillation providing mechanism 12 is viewed from the axial direction of the oscillation axis V.

Note that directions of X, Y, and Z illustrated in FIGS. 2A and 2B can be set discretionarily regardless of the up-and-down direction, the right-and-left direction, and the depth direction of the image display apparatus 50 illustrated in FIG. 1. In other words, the oscillation providing mechanism 12 can be placed within the image display apparatus 50 in any direction (any orientation). Thus, the direction of the oscillation axis V (the oscillation direction) is not limited, and can be set discretionarily.

FIG. 2A is a side view of the oscillation providing mechanism 12 as viewed from the right.

FIG. 2B is a cross-sectional view of the oscillation providing mechanism 12, where only a support member 19 of the oscillation providing mechanism 12 illustrated in FIG. 2A is cut in parallel with the up-and-down direction along a plane that includes the oscillation axis V.

The oscillation providing mechanism 12 includes an actuator 17, a contact member 18, the support member 19, a biasing member 20, and a fixation member 21.

The actuator 17 can generate oscillation along the oscillation axis V.

For example, a piezoelectric element (a piezo element) or a dielectric elastomer that enables electromechanical conversion is used in the actuator 17.

Piezoelectric actuators, such as PZT stacks, are compact and reliable, and have properties of high stress, high bandwidth, and high-power density, in addition to having stable material properties.

Further, a magnetic field bias is not necessary for the piezo actuators, which is different from magnetostrictive actuators. This make is possible to obtain an actuator having a simpler configuration, and thus the actuator 17 can be made smaller.

Figure 3:
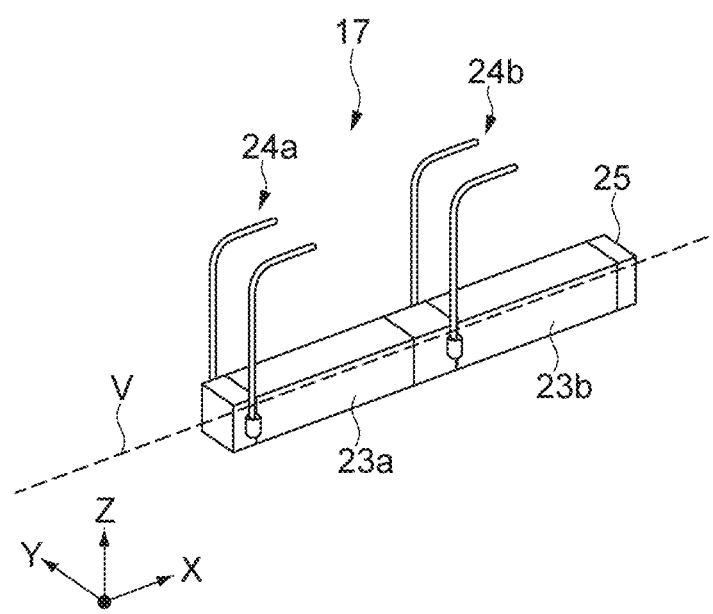
FIG. 3 schematically illustrates an example of a configuration of an actuator.

FIG. 3 schematically illustrates an example of a configuration of the actuator 17.

For example, piezoelectric elements 23a and 23b that extend in a certain direction are connected to each other and arranged along the oscillation axis V, as illustrated in FIG. 3. Voltage is applied to a lead wire 24a of the piezoelectric element 23a and a lead wire 24b of the piezoelectric element 23b through wiring (not illustrated). This makes it possible to generate oscillation along the oscillation axis V from a displacement of each of the piezoelectric elements 23a and 23b.

For example, the piezoelectric elements 23a and 23b may be individually driven, or may be driven together. Of course, a structure of wiring electrically connected to the lead wires 24a and 24b is not limited, and may be designed discretionarily.

The two piezoelectric elements 23a and 23b are used by being connected to each other, and this makes it possible to generate oscillation stably, and thus to obtain excellent acoustic properties.

For example, sufficiently excellent acoustic properties can be obtained due to an amplitude of from about 1.5 μm to about 2.0 μm. Of course, the amplitude of oscillation generated by the actuator 17 is not limited, and designing may be performed as appropriate such that a desired level of acoustic properties is obtained.

Moreover, the configuration of the actuator 17 is not limited, and any configuration may be adopted.

Note that an end of the actuator 17 that is situated opposite to the oscillation-provision-target member 15 in the axial direction of the oscillation axis V (the X direction), is referred to as a rear end 25, as illustrated in FIGS. 2B and 3.

The contact member 18 is configured to be connected to the actuator 17, and to be brought into contact with the oscillation-provision-target member 15.

In other words, oscillation generated by the actuator 17 is transmitted to the oscillation-provision-target member 15 through the contact member 18.

For example, a member made of brass that has a high specific gravity and provides an echo effect is used as the contact member 18. This makes it possible to improve the acoustic properties.

Of course, a shape and a material of the contact member, a method for forming the contact member, and the like are not limited, and the contact member may be designed discretionarily.

Figure 4A:
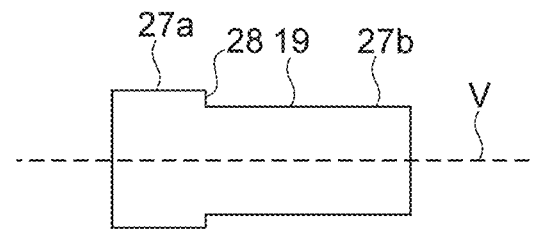
FIGS. 4A, 4B, and 4C schematically illustrate an example of a configuration of a support member.
Figure 4B:
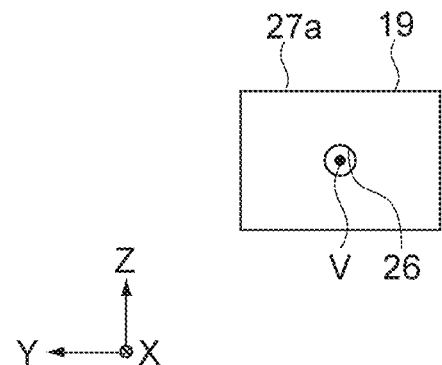
Figure 4C:
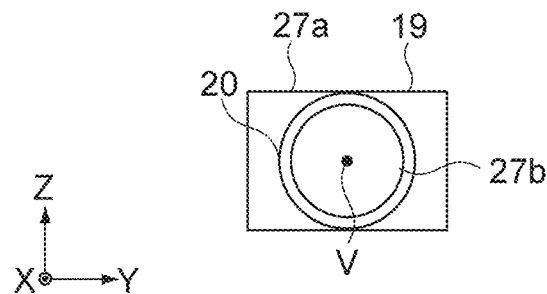

FIGS. 4A, 4B, and 4C schematically illustrate an example of a configuration of the support member 19.

FIG. 4A is a side view of the support member 19 as viewed from the right.

FIG. 4B is a front view of the support member 19 as viewed from the front.

FIG. 4C illustrates the support member 19 to which the biasing member 20 is attached, as viewed from the rear.

The support member 19 supports the actuator 17. As illustrated in FIG. 4B, a support hole 26 is formed in the support member 19 along the oscillation axis V. In other words, the support member 19 is hollow, and supports the actuator 17 by accommodating therein the actuator 17.

Further, the support member 19 is configured by a front portion 27a and a rear portion 27b being coupled to each other in the axial direction of the oscillation axis V. The front portion 27a has a rectangular-parallelepiped shape, and the rear portion 27b has a cylindrical shape. A step is formed in a portion in which the front portion 27a and the rear portion 27b are coupled to each other, and serves as a front support 28 that supports a front end 20a of the biasing member 20.

A die-cast member (a cast member) that is formed by die casting (die-cast processing) is used as the support member 19. For example, the support member 19 can be formed using, for example, an aluminum alloy, a zinc alloy, or a magnesium alloy.

Further, a press member that is formed by pressing (press processing) is used as the support member 19. For example, the support member 19 can be formed using, for example, brass.

Furthermore, the support member 19 can be configured by a plurality of members being assembled. For example, the support member 19 may be configured by a material made of a resin material such as polycarbonate (PC), and a press member being assembled.

Further, a member used to support the front end 20a of the biasing member 20 (a member that serves as the front support 28) may be separately attached.

For example, the support member 19 is formed using a single die-cast member. This makes it possible to reduce a loss in oscillation transmission, and thus to stably oscillate the oscillation-provision-target member 15. This makes it possible to improve the acoustic properties.

Furthermore, the support member 19 is configured by a press member and a member made of a resin material being used in combination. This makes it possible to reduce costs for components.

Moreover, a shape and a material of the support member 19, a method for forming the support member 19, and the like are not limited, and the support member 19 may be designed discretionarily.

The fixation member 21 fixes the support member 19 at a specified location in the image display apparatus 50. For example, the fixation member 21 is connected to a specified fixation-side member 30 that is included in the image display apparatus 50, as illustrated in FIGS. 2A and 2B.

The support member 19 is fixed to the fixation-side member 30 by being held by the fixation member 21.

The fixation member 21 includes a connection portion 21a and a holding portion 21b.

In the present embodiment, the connection portion 21a in the form of a flat plate and the holding portion 21b in the form of a flat plate are coupled to be orthogonal to each other. Thus, the entirety of the fixation member 21 has an L shape.

The connection portion 21a is a portion that is connected to the fixation-side member 30. A configuration and a method for connecting the connection portion 21a to the fixation-side member 30 are not limited, and any method such as screwing or welding may be adopted.

The holding portion 21 b is a portion that holds the support member 19. In the present embodiment, an attachment hole is formed in the holding portion 21b to extend in parallel with the axial direction of the oscillation axis V (the X direction). The rear portion 27b of the support member 19 is held by being inserted into the attachment hole.

A configuration of and a method for connecting the support member 19 to the holding portion 29b are not limited, and any method may be adopted.

The fixation member 21 is made of a metallic material such as aluminum, an electrogalvanized steel (SECC), or a cold-rolled material (such as SPCC).

Moreover, a shape and a material of the fixation member 21, a method for forming the fixation member 21, and the like are not limited, and the fixation member 21 may be designed discretionarily.

The biasing member 20 biases the support member 19 toward the oscillation-provision-target member 15. In other words, due to the biasing member 20, a force acts on the support member 19 in a direction of the oscillation-provision-target member 15.

As illustrated in FIGS. 2A, 2B, and 4C, the biasing member 20 is provided around the support member 19 as viewed along the oscillation axis V. In other words, the biasing member 20 is arranged in a portion that corresponds to a lateral side of the support member 19 when the support member 19 is viewed from the front or the rear along the oscillation axis V.

The biasing member 20 is not limited to being arranged to cover all of a peripheral surface (the lateral side) of the support member 19. The biasing member 20 may be arranged on a portion of the peripheral surface of the support member 19.

In the present embodiment, a coil spring is arranged as the biasing member 20 around the support member 19 (hereinafter denoted by the same reference numeral to be referred to as a coil spring 20). The coil spring 20 is attached to the cylindrical rear portion 27b of the support member 19.

In the axial direction of the oscillation axis V, the front end 20a of the coil spring 20 is supported by the step formed in the support member 19, that is, the front support 28. A rear end 20b of the coil spring 20 is supported by the holding portion 21b of the fixation member 21. In other words, in the present embodiment, the holding portion 21b of the fixation member 21 serves as a rear support that holds the rear end 20b of the biasing member 20.

In the axial direction of the oscillation axis V, a distance between the front support 28 and the holding portion 21b (the rear support) is set as appropriate. This makes it possible to bias the support member 19 toward the oscillation-provision-target member 15 due to an elastic force being caused by the coil spring 20.

Consequently, the actuator 17 and the contact member 18 being supported by the support member 19 are also biased toward the oscillation-provision-target member 15. This results in being able to stably transmit oscillation generated by the actuator 17 to the oscillation-provision-target member 15. This makes it possible to stabilize sound pressure.

A specific magnitude of a biasing force (load) that is generated by the biasing member 20 is not limited. For example, the magnitude is set such that the oscillation-provision-target member 15 is not unintendedly deformed by the biasing force. Further, the magnitude is set such that a deformation due to, for example, assembly tolerances or a degradation over time can be absorbed.

When, for example, a load of from 2.0 kgf to 3.0 kgf acts, this makes it possible to absorb a deviation of about +/−3.0 mm in parallel with the axial direction of the oscillation axis V (a relative deviation of the oscillation providing mechanism 12 from an oscillation-provision point in the oscillation-provision-target member 15). This results in obtaining sufficiently excellent acoustic properties. Of course, the deviation is not limited to this range.

As illustrated in FIGS. 2A and 2B, the coil spring 20 is arranged closer to the oscillation-provision-target member 15 than the rear end 25 of the actuator 17 in the axial direction of the oscillation axis V. In other words, the rear end 20b of the coil spring 20 is arranged further forward than the rear end 25 of the actuator 17.

With respect to the arrangement of the coil spring 20, the coil spring 20 is laid out around the actuator 17, as described above. In other words, the coil spring 20 is arranged at a location at which the coil spring 20 overlaps the actuator 17 in the axial direction of the oscillation axis V.

This makes it possible to make the oscillation providing mechanism 12 smaller in size in the front-rear direction (the depth direction), and thus to make the oscillation providing mechanism 12 compact in size. This results in being able to make the image display apparatus 50 thinner and smaller.

A specific configuration of the coil spring 20 is not limited, and the coil spring 20 may be designed discretionarily with respect to a free length, a spring constant, and the like of the coil spring 20.

Further, a configuration and a material of the biasing member 20 itself, a method for forming the biasing member 20 itself, and the like are also not limited, and the biasing member 20 may be designed discretionarily. For example, the biasing member 20 may be formed using a leaf spring. In this case, the oscillation providing mechanism 12 can also be made compact in size by arranging the biasing member 20 closer to the oscillation-provision-target member 15 than the rear end 25 of the actuator 17.

Figure 5A:
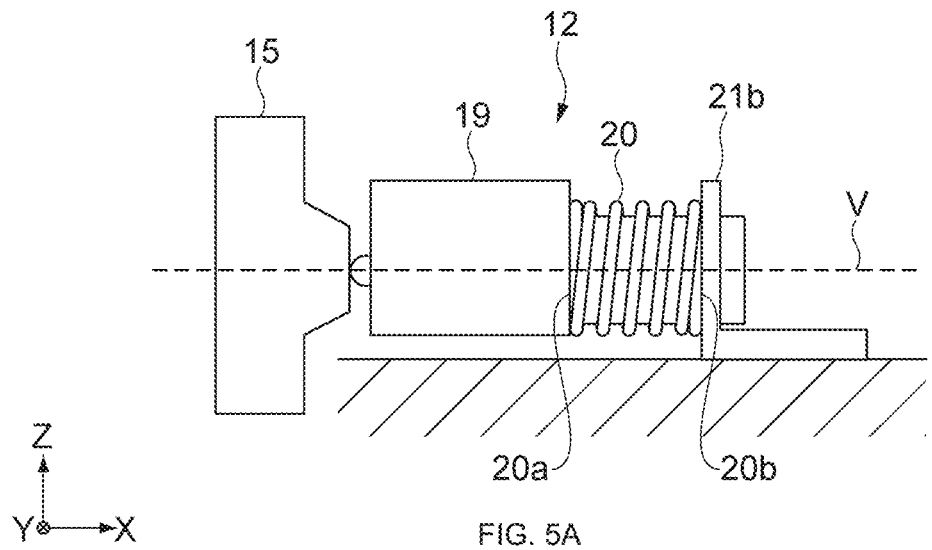
FIGS. 5A and 5B schematically illustrate another example of the configuration of the oscillation providing mechanism.
Figure 5B:
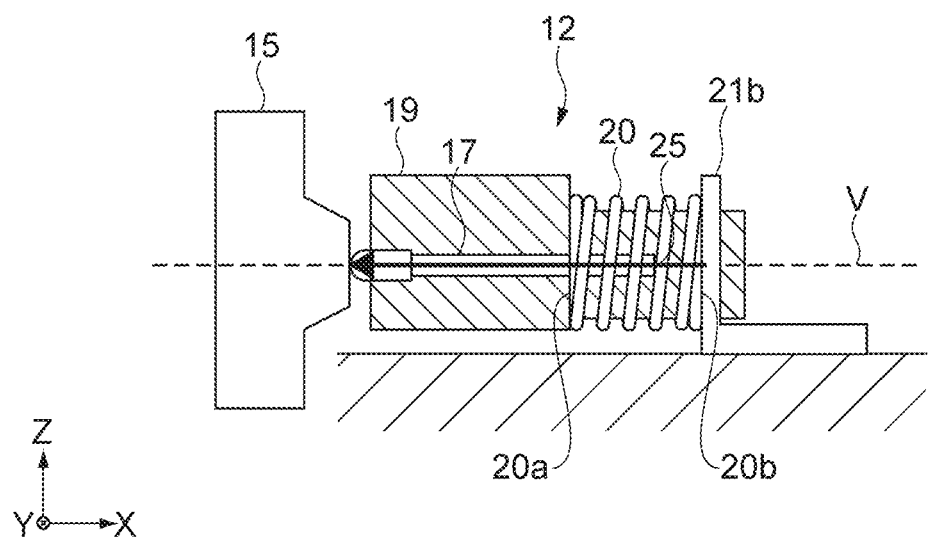

FIGS. 5A and 5B schematically illustrate another example of the configuration of the oscillation providing mechanism.

In the oscillation providing mechanism 12 illustrated in FIGS. 5A and 5B, the front end 20a of the coil spring 20 is supported at a location situated further forward than the rear end 25 of the actuator 17. On the other hand, the rear end 20b of the coil spring 20 is held by the holding portion 21b of the fixation member 21 at a location further rearward than the rear end 25 of the actuator 17.

As described above, only a portion of the biasing member 20 may be arranged further forward than the rear end 25 of the actuator 17. In other words, only a front portion of the biasing member 20 may overlap the actuator 17 in the axial direction of the oscillation axis V.

As described above, at least a portion of the biasing member 20 is arranged closer to the oscillation-provision-target member 15 than the rear end 25 of the actuator 17 in the axial direction of the oscillation axis V. This makes it possible to make the oscillation providing mechanism 12 smaller in size in the front-rear direction.

Note that arranging the entirety of the biasing member 20 closer to the oscillation-provision-target member 15 than the rear end 25 of the actuator 17 is more advantageous in making the oscillation providing mechanism 12 compact in size.

[Oscillation-Provision-Target Member]

Using the oscillation providing mechanism 12, any member included in the image display apparatus 50 can be oscillated as the oscillation-provision-target member 15.

With respect to how to select the oscillation-provision-target member 15, selection is performed focused on a functional mechanism that performs a specified function. Typically, the specified function is a mechanism that is different from a sound output function.

A member that is included in the functional mechanism performing the specified function is selected as the oscillation-provision-target member 15. It can also be said that the member included in the functional mechanism is a member that is indispensable when the functional mechanism performing the specified function.

In the example illustrated in FIG. 1, a mechanism that performs an image display function of the image display apparatus 50 corresponds to a functional mechanism. For example, the display panel 10 and the frame 11 supporting the display panel 10 in FIG. 1 correspond to members that are included in the functional mechanism. In other words, the display panel 10 and the frame 11 are members that are indispensable for performing the image display function.

On the other hand, for example, a bezel that is arranged on the peripheral portion of the display panel 10 for, for example, ornamental purposes and is not a member indispensable for performing the image display function, is not included in components included in the functional mechanism.

In the example illustrated in FIG. 1, the left frame 11c included in the functional mechanism performing the image display function is oscillated by the oscillation providing mechanism 12a, and the right frame 11d included in the functional mechanism performing the image display function is oscillated by the oscillation providing mechanism 12b. This results in outputting sound.

FIGS. 6A, 6B, and 6C schematically illustrate the left frame 11c and the oscillation providing mechanism 12a. Respective directions of "right-and-left", "up-and-down", and "depth" in the figure correspond to those illustrated in FIG. 1.

In the present embodiment, a sound output region S is set in the left frame 11c. In other words, for the purpose of outputting sound using oscillation, the sound output region S is formed in a member that is indispensable for performing the image display function different from the sound output function.

The sound output region S is configured to have a relatively small thickness. In other words, the sound output region S is configured to have a smaller thickness than a region other than the sound output region S when the entirety of the left frame 11c is viewed.

For example, the sound output region S is configured to have a smallest thickness among portions included in the left frame 11c. Without being limited thereto, the sound output region S may have a thickness of which a value is determined to be in a small-thickness range when the thicknesses of the respective portions included in the left frame 11c are statistically observed. In other words, the relatively small thickness is not limited to a smallest thickness.

For example, a specified region in a frame having a thickness of 2 mm is made thinner by, for example, NC machining, such that the specified region has a thickness of 1 mm. This makes it possible to easily obtain the sound output region S. Of course, the method for forming the sound output region S is not limited.

As illustrated in FIGS. 6A, 6B, and 6C, the left frame 11c has a shape that extends in a certain direction. For example, a region that has a specified length in a direction of the extension is configured as the sound output region S. A location of the sound output region S in the extension direction (locations of two ends of the sound output region S), a length of the sound output region S (a distance between the two ends), and the like are not limited, and the sound output region S may be designed discretionarily.

For example, as illustrated in FIG. 6A, the sound output region S may be set to be vertically symmetric about a line corresponding to a location at which oscillation is provided by the oscillation providing mechanism 12a (a location of an oscillation-provision point).

Further, as illustrated in FIG. 6B, the sound output region S may be set such that a portion of the sound output region S that is situated below the oscillation-provision point is larger.

In FIGS. 6A and 6B, the sound output region S is set to include, in the direction of the extension of the left frame 11c, the location at which oscillation is provided by the oscillation providing mechanism 12a.

Without being limited thereto, the sound output region S may be set at a location at which the sound output region S does not include the location at which oscillation is provided by the oscillation providing mechanism S, as illustrated in FIG. 6C.

Moreover, a plurality of regions can be configured as the sound output region S.

With respect to, for example, a location, a length, and a thickness of the sound output region S, it is sufficient if the sound output region S is designed as appropriate on the basis of, for example, what range of frequencies of sound (such as a low-frequency sound, a low-midrange-frequency sound, a midrange-frequency sound, a high-midrange-frequency sound, and a high-frequency sound) is to be output, or how sound is to be localized, or what sound image is to be obtained.

For example, a ratio of a length of the sound output region S to a total length of the left frame 11c is controlled. Alternatively, a proper length of the sound output region S is calculated, and is set to be a fixed value. For example, such designing methods can be adopted.

The appropriate formation of the sound output region S makes it possible to improve the sound quality, a sound pressure, and a level of spaciousness of sound perceived. Further, in the example illustrated in FIG. 1, it is also possible to control, for example, a sound balance between the right and the left, and the vertical spaciousness of sound perceived. Furthermore, it is also possible to achieve an integral output of sound that is performed together with another speaker. In other words, a space with desired sound can be provided.

Note that the oscillation-provision-target member 15 is not limited to a member, such as the left frame 11c, that extends in a certain direction. A plate member such as a back chassis, a diffusion plate, or the display panel 10 may be selected as the oscillation-provision-target member 15. A space with high-quality sound can also be provided in this case by setting a specified region in the oscillation-provision-target member 15 to be the sound output region S.

[Specific Example of Configuration of Oscillation Providing Mechanism]

A specific example of the configuration of the oscillation providing mechanism is described with reference to FIGS. 7, 8, 9, 10, 11, 12, 13A, 13B, 13C, 14A, 14B, 14C, 15A, 15B, 15C, 16A, 16B, 17A, 17B, and 18.

It is assumed that an oscillation providing mechanism 112a and an oscillation providing mechanism 112b are respectively attached to the left frame 11c and the right frame 11d, with the left frame 11c and the right frame 11d respectively being the oscillation-provision-target member 15 for the oscillation providing mechanism 112a and the oscillation-provision-target member 15 for the oscillation providing mechanism 112b, as in the case of the image display apparatus 50 illustrated in FIG. 1.

In FIGS. 7, 8, 9, 10, 11, 12, 13A, 13B, 13C, 14A, 14B, 14C, 15A, 15B, 15C, 16A, 16B, 17A, 17B, and 18, respective directions of "right-and-left", "up-and-down", and "depth" in the figures correspond to those illustrated in FIG. 1. Further, coordinates of X, Y, and Z in the figures correspond to those illustrated in each of FIGS. 2A, 2B, 3, 4A, 4B, 4C, 5A, and 5B, and a definition for the direction that is similar to the definition described above is used.

Figure 7:
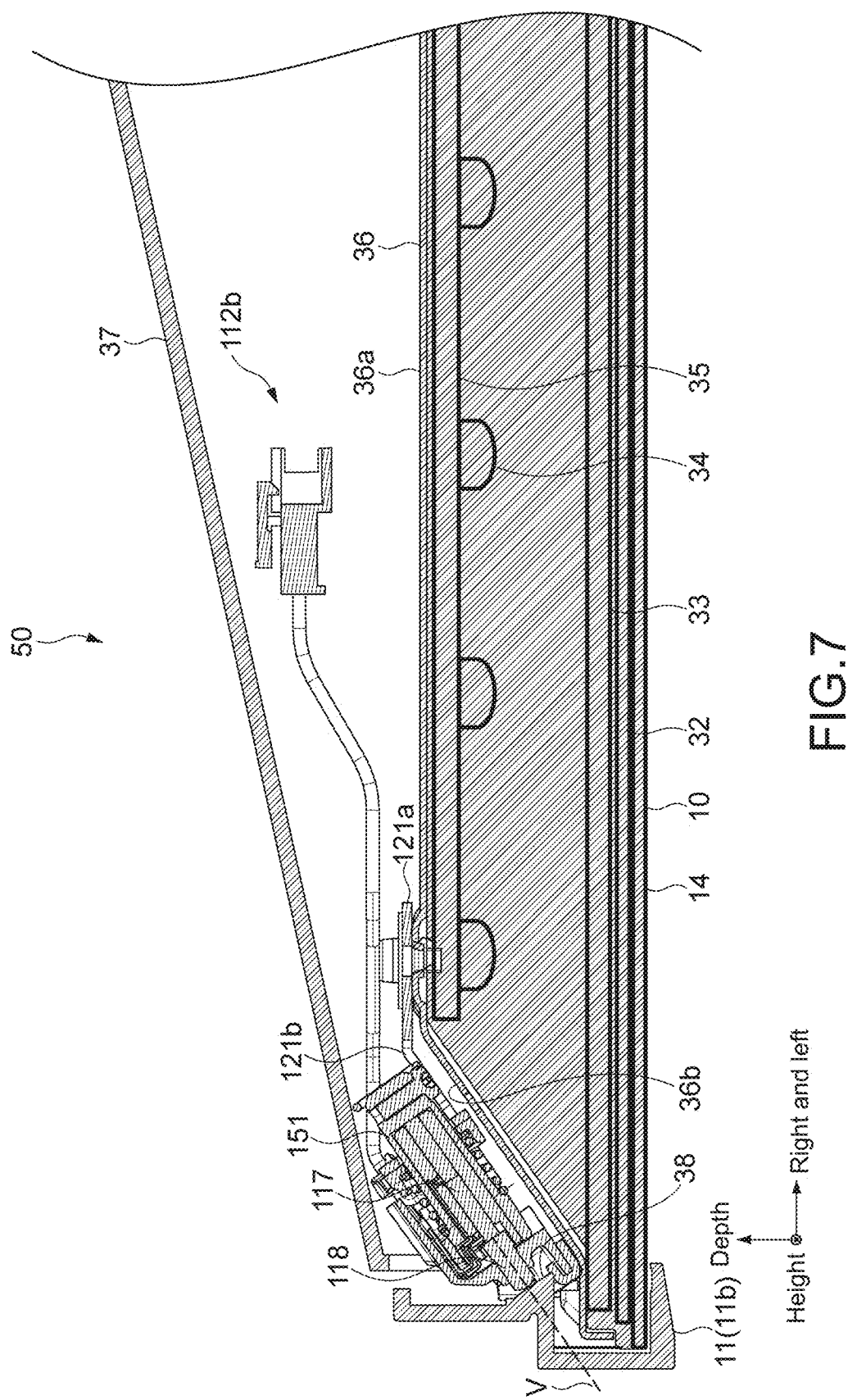
FIG. 7 is a cross-sectional view along the line D-D illustrated in FIG. 1, and schematically illustrates enlarged portions of the left frame and the oscillation providing mechanism.

FIG. 7 is a cross-sectional view along the line D-D illustrated in FIG. 1, and schematically illustrates enlarged portions of the left frame 11c and the oscillation providing mechanism 112a.

Figure 8:
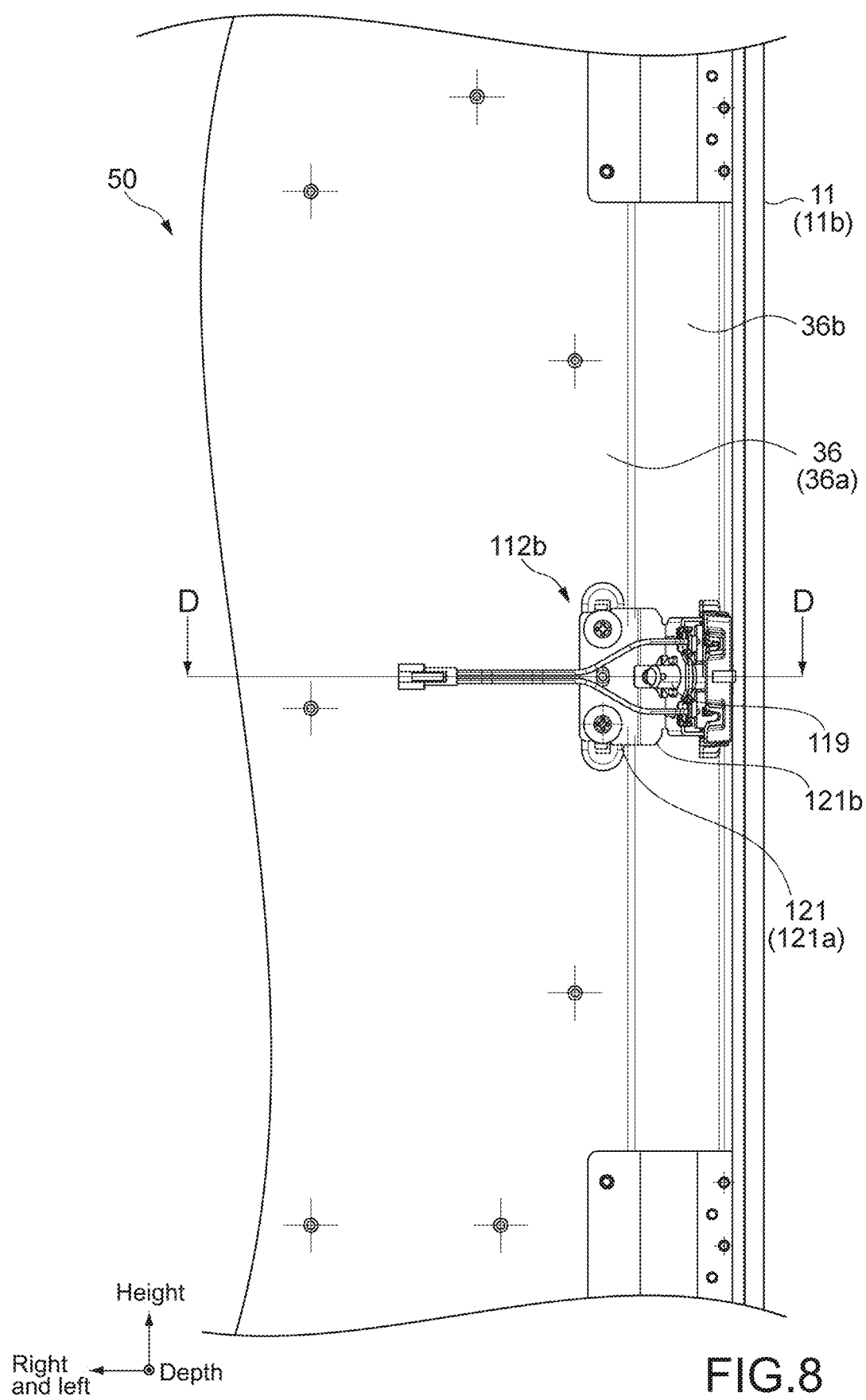
FIG. 8 illustrates the portions of the left frame and the oscillation providing mechanism, as viewed from a back surface of the image display apparatus.

FIG. 8 illustrates the portions of the left frame 11c and the oscillation providing mechanism 112a, as viewed from a back surface of the image display apparatus 50. The line D-D in the figure corresponds to the line D-D illustrated in FIG. 1. Further, it can also be said that FIG. 8 illustrates a state in which a rear cover 37 illustrated in FIG. 7 has been removed.

In the example illustrated in FIGS. 7 and 8, the image display apparatus 50 includes the display panel 10, the frame 11 (the left frame 11c), optical sheets 32, a diffusion plate 33, a light source (with a lens) 34, a light-source substrate 35, a back chassis 36, and the rear cover 37. From among these members, the members other than the rear cover 37 are members that are included in a functional mechanism that performs an image display function.

Any optical sheet such as a diffusion sheet, a prism sheet, or a protective sheet may be used as the optical sheets 32.

The diffusion plate 33 having any configuration may be used.

For example, a light-emitting diode (LED) or a laser diode (LD) is used as the light source 34. For example, any collimator lens is attached as the lens of the light source 34.

The light-source substrate 35 having any configuration may be used.

The back chassis 36 made of a metallic material such as aluminum is used. Without being limited thereto, any configuration may be adopted.

The rear cover 37 made of a metallic material such as aluminum is used. Without being limited thereto, any configuration may be adopted.

A specific configuration of the functional mechanism performing the image display function is not limited, and any configuration may be adopted.

In the example illustrated in FIG. 7, the back chassis 36 includes a flat-plate portion 36a and an inclination portion 36b, the flat-plate portion 36a being parallel to the right-and-left direction and the height direction, that is, parallel to the display surface 14 of the display panel 10, the inclination portion 36b extending from each of right and left ends of the flat-plate portion 36a. The flat-plate portion 36a is a portion that corresponds to a rear side of the light-source substrate 35.

The inclination portion 36b extends diagonally forward from each of the right and left ends of the flat-plate portion 36a toward right and left ends of, for example, the diffusion plate 33 being arranged on the front side. The right and left inclination portions 36b extend diagonally outward in a direction of the front side, as viewed from the flat-plate portion 36a in a direction of a side on which an image is displayed (a viewer side).

The rear cover 37 is connected to the frame 11 (the left frame 11c). The rear cover 37 is configured to be inclined to extend such that a portion of the rear cover 37 that is situated more rightward than a portion in the rear cover 37 that is connected to the left frame 11c, is closer to the back. This configuration is advantageous in making the image display apparatus 50 thinner.

As illustrated in FIG. 7, the oscillation providing mechanism 112a is arranged in a space between the inclination portion 36b of the back chassis 36 and the rear cover 37. The oscillation providing mechanism 112a is arranged to be brought into contact with the left frame 11c.

Specifically, a connection portion 121a of a fixation member 121 of the oscillation providing mechanism 112a is connected to a portion at a left end of the flat-plate portion 36a of the back chassis 36 by screwing. In other words, the oscillation providing mechanism 112a is fixed to the functional mechanism in the present embodiment.

A holding portion 121b of the fixation member 121 extends in parallel with the inclination portion 36b of the back chassis 36. A body 151 of the oscillation providing mechanism 112a is held by the holding portion 121b. A contact member 118 connected to an actuator 117 in the oscillation providing mechanism 112a is arranged to be brought into contact with an oscillation-provision-target surface 38 of the left frame 11c.

Oscillation generated along the oscillation axis V is transmitted to the oscillation-provision-target surface 38 through the contact member 118. The oscillation-provision-target surface 38 extends obliquely to the depth direction to face the oscillation providing mechanism 112a. The oscillation-provision-target surface 38 corresponds to an oscillation-provision point.

Figure 9:
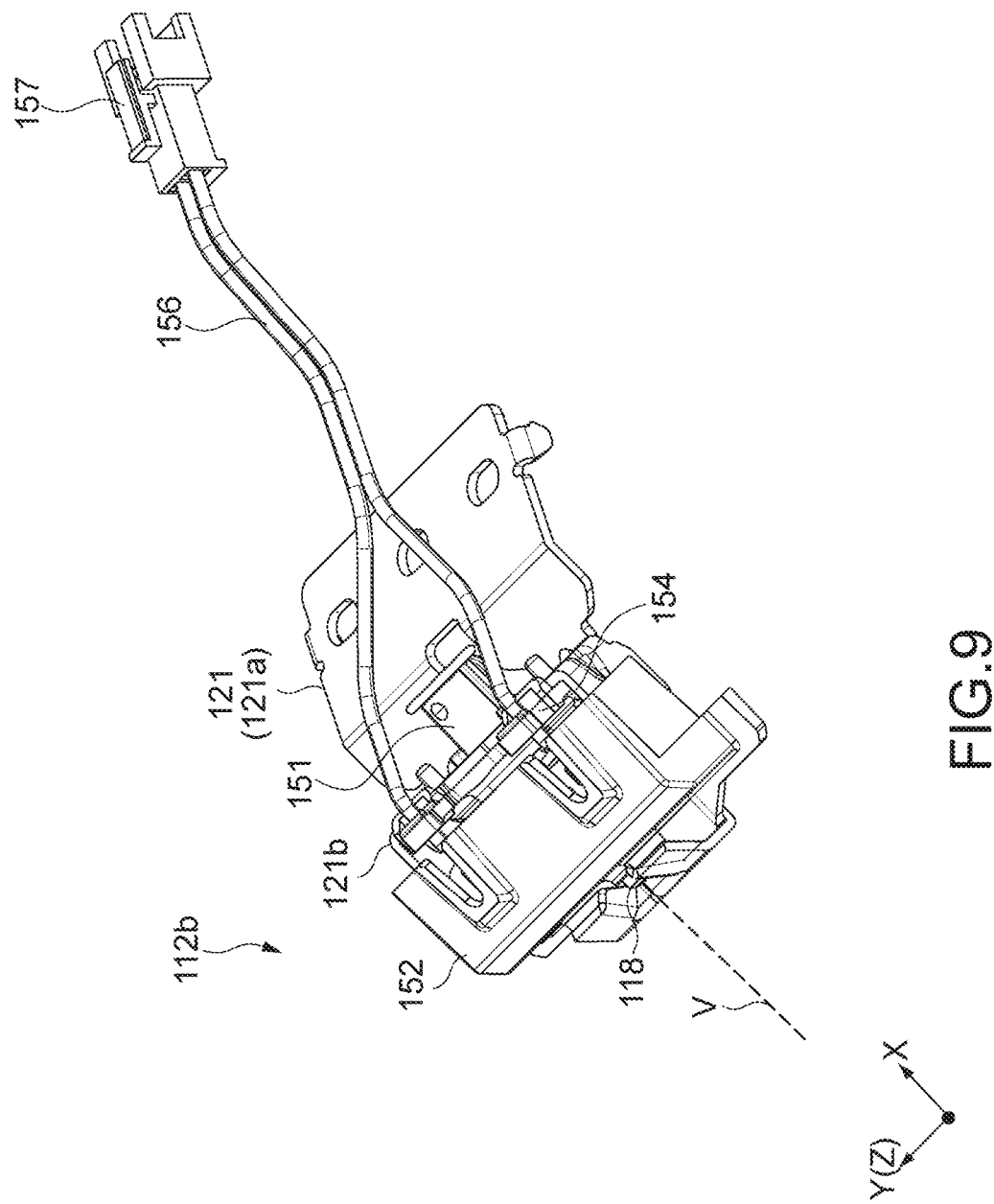
FIG. 9 is a perspective view of the oscillation providing mechanism as viewed from the diagonally upward right.

FIG. 9 is a perspective view of the oscillation providing mechanism 112a as viewed from the diagonally upward right.

Figure 10:
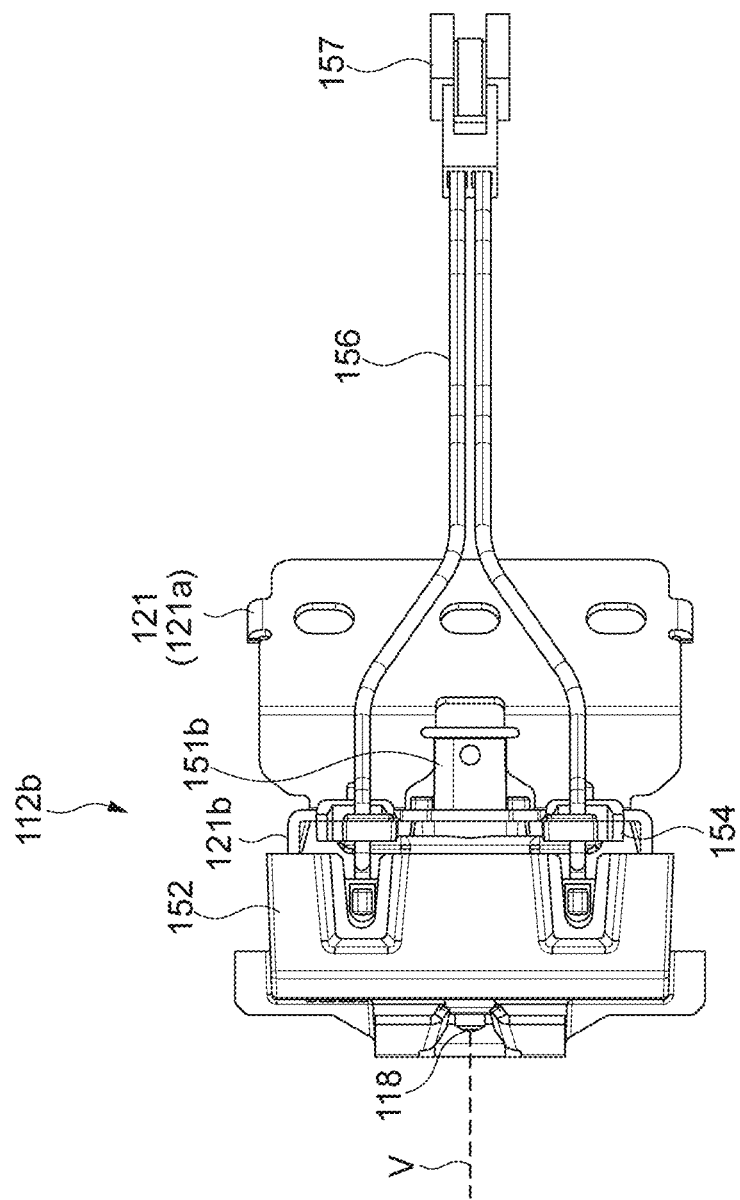
FIG. 10 is a top view of the oscillation providing mechanism as viewed from above.

FIG. 10 is a top view of the oscillation providing mechanism 112a as viewed from above.

Figure 11:
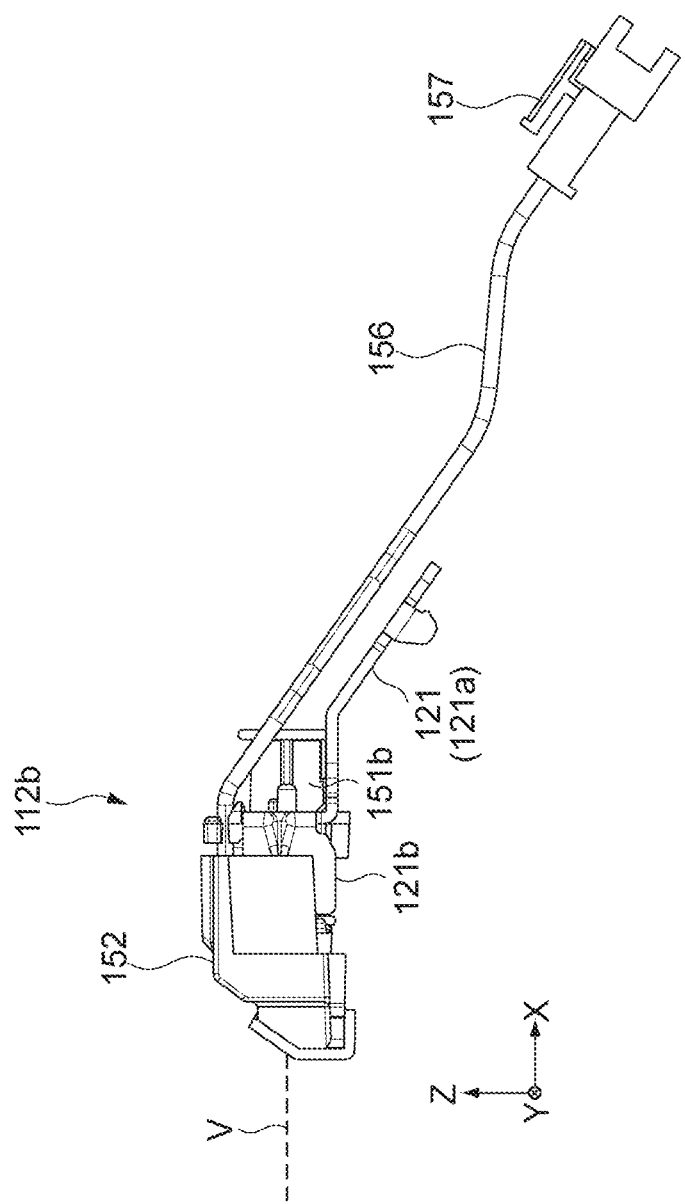
FIG. 11 is a side view of the oscillation providing mechanism 112 as viewed from the right.

FIG. 11 is a side view of the oscillation providing mechanism 112a as viewed from the right.

Figure 12:
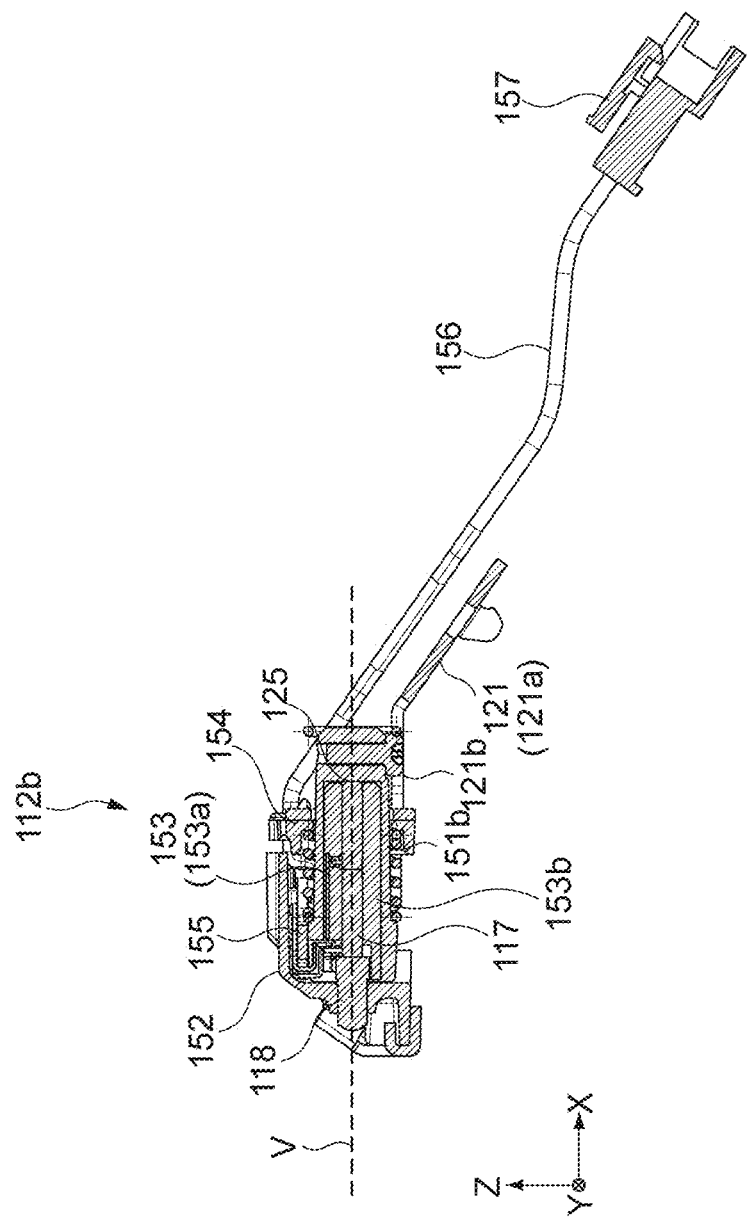
FIG. 12 is a cross-sectional view along the line D-D in FIG. 8, and corresponds to a cross-sectional view of the oscillation providing mechanism a as viewed from the right.

FIG. 12 is a cross-sectional view along the line D-D in FIG. 8, and corresponds to a cross-sectional view of the oscillation providing mechanism 112a as viewed from the right.

FIGS. 13A, 13B, 13C, 14A, 14B, 14C, 15A, 15B, and 15C each schematically individually illustrate members that are included in the oscillation providing mechanism 112a.

The oscillation providing mechanism 112a includes the actuator 117, the contact member 118, the body 151, a coil spring 120, and the fixation member 121. Further, the oscillation providing mechanism 112a includes a cover 152, a case portion 153, a rear support 154, a printed wiring board (PWB) 155, and wiring 156.

Figure 14A:
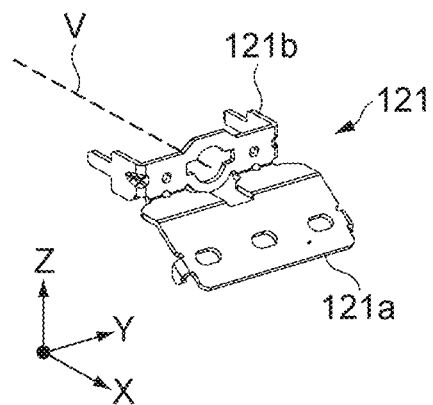
FIGS. 14A, 14B, and 14C schematically illustrate examples of respective configurations of a fixation member, a contact member, and a case member.

As illustrated in FIG. 14A, the solid member 121 includes the connection portion 121a and the holding portion 121b. The holding portion 121b extends in parallel with the axial direction of the oscillation axis V, and can hold the body 151 such that the body 151 is caught in the holding portion 121b from the right and from the left.

In the present embodiment, the fixation member 121 is made of a SECC.

Figure 13A:
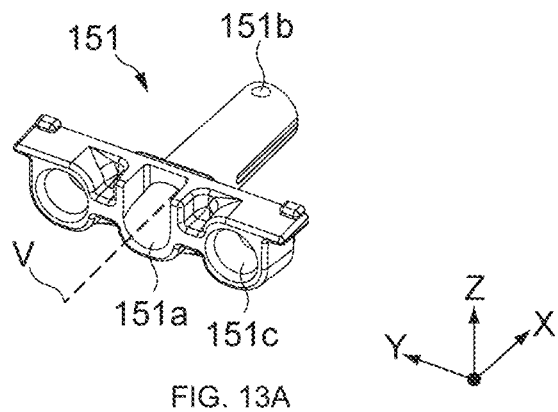
FIGS. 13A, 13B, and 13C schematically illustrate an example of a configuration of a body.

FIG. 13A is a perspective view of the body 151.

Figure 13B:
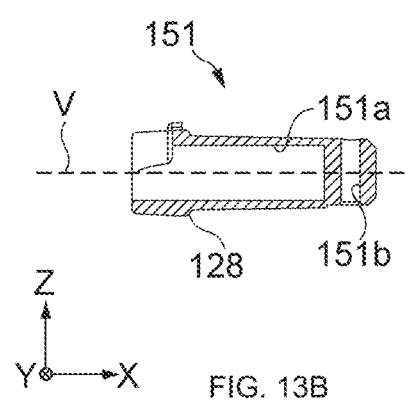

FIG. 13B is a cross-sectional view of the body 151 being cut in parallel with the X direction along a plane that includes the oscillation axis V.

Figure 13C:
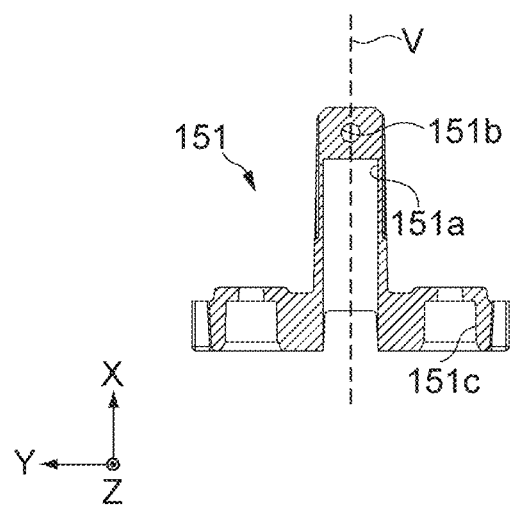

FIG. 13C is a cross-sectional view of the body 151 being cut in parallel with the Y direction along a plane that includes the oscillation axis V.

The entirety of the body 151 has a substantially T-shape. A support hole 151a is formed in a middle portion of a front portion of the body 151 (on the side of the left frame 11c). The support hole 151a is formed within the body 151 to extend in parallel with the axial direction of the oscillation axis V. Thus, the body 151 is hollow.

As illustrated in FIG. 13B, an attachment hole 151b is formed in a rear portion of the body 151. A fastening member such as a screw is attached to the attachment hole 151b, and the body 151 and the holding portion 121b of the fixation member 121 are connected to each other.

As illustrated in FIG. 13A, an attachment hole 151c is formed on each of two sides of the support hole 151a. A fastening member such as a screw is attached to the attachment hole 151c, and the body 151, the cover 152, and the rear support 154 are connected to each other. When these members are connected to each other on the two sides of the support hole 151a, this results in improving the durability of the oscillation providing mechanism 112a.

As illustrated in FIG. 13B, a step that serves as a front support 128 that supports the front end of the coil spring 120 is formed in a front portion of the body 151.

In the present embodiment, the body 151 is a die-cast member made of an aluminum alloy.

As illustrated in FIG. 12, the actuator 117 is formed by two piezoelectric elements being arranged side by side to extend in parallel with the axial direction of the oscillation axis V, as illustrated in FIG. 3.

A lead wire of each of the two piezoelectric elements is routed up to the PWB 155 arranged above the body 151. Further, the lead wire is electrically connected to the wiring 156 on the PWB 155.

A connector 157 is situated at a tip of the wiring 156, and the wiring 156 and the controller 13 are electrically connected to each other through the connector 157.

Specific configurations of the PWB 155, the wiring 156, and the connector 157 are not limited, and the wiring 156, and the connector 157 may be designed discretionarily.

Figure 14B:
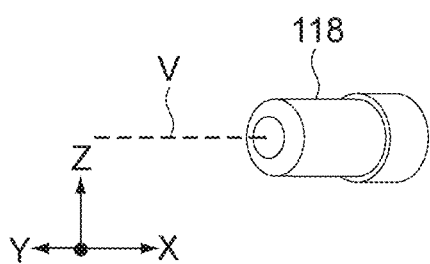

As illustrated in FIG. 14B, the contact member 118 is configured to have a substantially cylindrical shape to extend in parallel with the axial direction of the oscillation axis V.

In the present embodiment, the contact member 118 is made of brass.

In the present embodiment, the actuator 117 is accommodated in the case portion 153, as illustrated in FIG. 12. Further, the case portion 153 accommodating therein the actuator 117 is accommodated in the support hole 151a of the body 151.

Figure 14C:
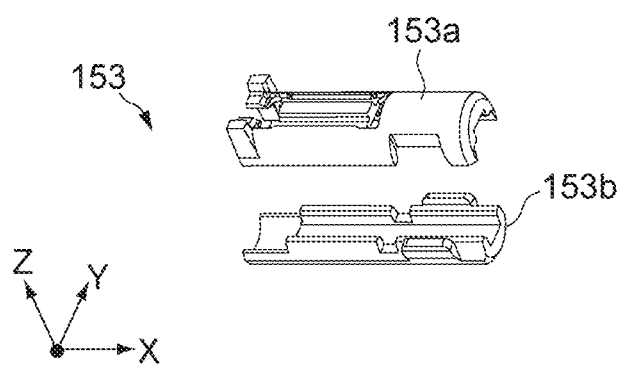

As illustrated in FIG. 14C, the case portion 153 includes an upper case 153a and a lower case 153b. The hollow, substantially cylindrical case portion 153 extending in parallel with the axial direction of the oscillation axis V, is configured by the upper case 153a and the lower case 153b being connected to each other.

The upper case 153a and the lower case 153b are made of PC. In the present embodiment, the body 151 and the case portion 153 form the support member 19 (refer to, for example, FIGS. 2A and 2B).

After the actuator 117 is on\ce accommodated in the case portion 153, the case portion 153 is accommodated in the body 151. This makes it possible to exhibit a high durability for, for example, an impact from a lateral direction with respect to the oscillation axis V.

Figure 15A:
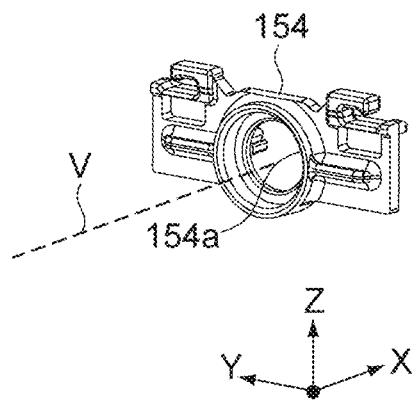
FIGS. 15A, 15B, and 15C schematically illustrate examples of respective configurations of a rear support, a coil spring, and a cover.

An attachment hole 154a is formed in a middle portion of the rear support 154 illustrated in FIG. 15A. A rear portion of the body 151 is inserted into the attachment hole 154a. Further, a rear side of the rear support 154 is supported by a flat-plate portion of the holding portion 121b of the fixation member 121, the flat-plate portion being orthogonal to the oscillation axis V.

As illustrated in FIG. 12, the rear support 154 is arranged further forward (arranged closer to the left frame 11c) than the rear end 125 of the actuator 117. The rear support 154 supports a rear end of the coil spring 120.

In the present embodiment, the rear support 154 is made of PC.

Figure 15B:
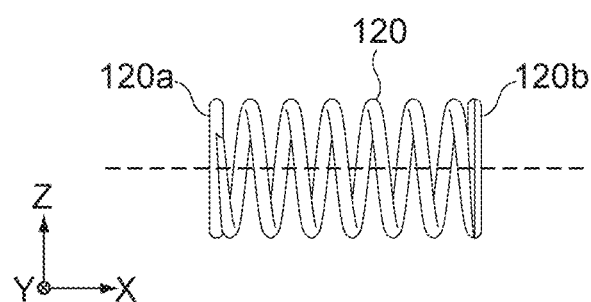

As illustrated in, for example, FIG. 15B, the coil spring 120 is arranged to extend in parallel with the axial direction of the oscillation axis V. A front end 120a of the coil spring 120 illustrated in FIG. 15B is supported by the front support 128 of the body 151 illustrated in FIG. 13B. The rear end 120b of the coil spring 120 is supported by the rear support 154.

Thus, the rear end 120b of the coil spring 120 is arranged further forward than the rear end 125 of the actuator 117, as illustrated in FIG. 12. In other words, the entirety of the coil spring 120 is arranged further forward than the rear end 125 of the actuator 117.

This makes it possible to make the oscillation providing mechanism 112a smaller in size in the front-rear direction (the depth direction), and thus to make the oscillation providing mechanism 112a compact in size. This results in being able to make the image display apparatus 50 thinner and smaller.

Figure 15C:
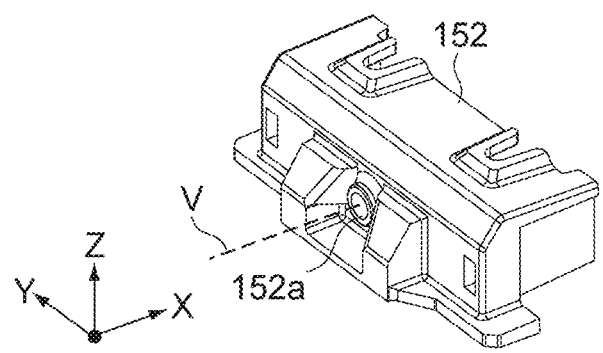

As illustrated in FIG. 15C, the cover 152 includes a through-hole 152a that is formed to extend in parallel with the axial direction of the oscillation axis V. The contact member 118 transmits oscillation to the left frame 11c through the through-hole 152a.

The cover 152 is arranged to cover the body 151 from above. The arrangement of the cover 152 makes it possible to improve the durability of the oscillation providing mechanism 112a. Further, this makes it possible to facilitate an operation when, for example, the oscillation providing mechanism 112a is attached.

In the present embodiment, the cover 152 is made of PC.

The cover 152 and the rear support 154 can also be considered members that are included in the support member according to the present technology.

FIGS. 16A, 16B, 17A, and 17B schematically illustrate a specific example of a configuration of the left frame 11c.

Figure 18:
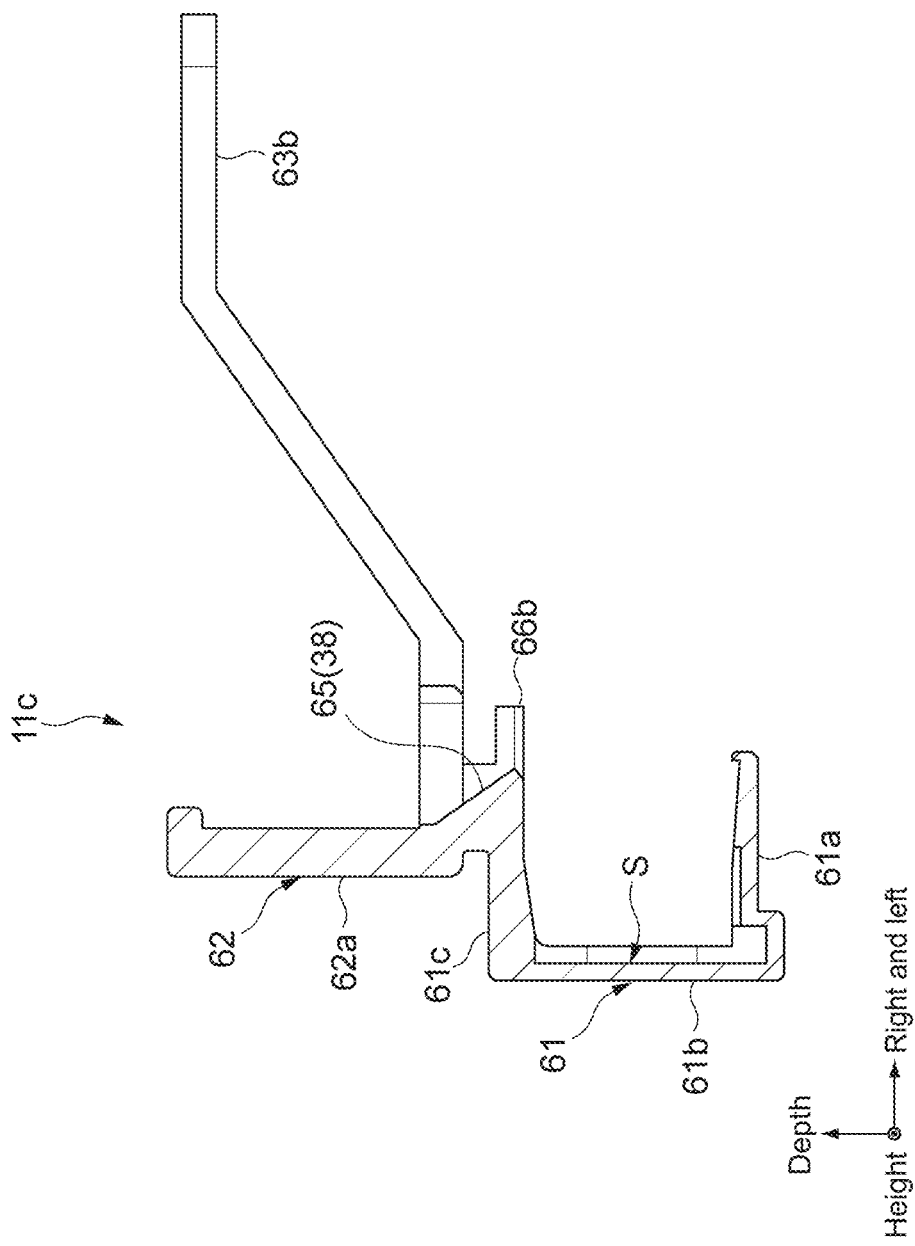
FIG. 18 is a cross-sectional view along the line D-D illustrated in FIGS. 16A 16B 17A and 17B.

FIG. 18 is a cross-sectional view along the line D-D illustrated in FIGS. 16A, and 16B or FIGS. 17A and 17B, and corresponds to the cross-sectional view illustrated in, for example, FIG. 7.

FIG. 16A illustrates the left frame 11c as viewed from the front. FIG. 16A corresponds to the left frame 11c of FIG. 18 as viewed from below in the figure.

FIG. 16B illustrates the left frame 11c as viewed from the left. FIG. 16B corresponds to the left frame 11c of FIG. 18 as viewed from the left in the figure. For example, the image display apparatus 50 illustrated in FIG. 1 is assumed to be viewed from the left. In this case, the left frame 11c is in a state illustrated in FIG. 16B.

FIG. 17A illustrates the left frame 11c as viewed from the rear. FIG. 17A corresponds to the left frame 11c of FIG. 18 as viewed from above in the figure.

FIG. 17B illustrates the left frame 11c as viewed from the right. FIG. 17B corresponds to the left frame 11c of FIG. 18 as viewed from the right in the figure. It can also be said that FIG. 17B illustrates the left frame 11c as viewed from the side of the oscillation providing mechanism 112a.

As illustrated in FIG. 18, the left frame 11c includes an anterior portion 61 and a posterior portion 62. The anterior portion 61 is a portion situated in a front portion of the left frame 11c when the left frame 11c is viewed from the front (corresponding to FIG. 16A).

As viewed from above, the cross section of the anterior portion 61 has a substantially rectangular shape that has an opening portion that corresponds to one of sides of the rectangle. In other words, the anterior portion 61 has a cross section that has a substantially U-shape of which an opening portion is situated on the right (on a side of the right frame 11d).

The anterior portion 61 includes a front face 61a that is situated on its front side, a lateral face 61b that is situated on the side of its left lateral side, and a rear face 61c that is situated on its rear side. The front face 61a and the lateral face 61b are connected to be orthogonal to each other, and the lateral face 61b and the rear face 61c are connected to be orthogonal to each other. This results in all of them forming the substantially U-shape.

The posterior portion 62 has a flat-plate shape that extends in parallel with the depth direction, and is connected to a tip of the rear face 61c of the anterior portion 61. In other words, the posterior portion 62 includes a plane portion 62a that extends in parallel with the depth direction.

As illustrated in FIG. 16B, the lateral face 61b of the anterior portion 61 in the planar direction, and the plane portion 62a of the posterior portion 62 in the planar direction are parallel to each other. This results in all of them forming a left lateral side of the left frame 11c.

As illustrated in FIGS. 16A, 16B, 17A, and 17B, a connection plate 63a is formed near an upper end of the left frame 11c, and a connection plate 63b is formed in a region that occupies about half a lower portion of the left frame 11c. The connection plates 63a and 63b are connected to the inclination portion 36b of the back chassis 36 by, for example, screwing.

A convex portion 65 that is included in the oscillation-provision-target surface 38 is formed at a specified location between the upper and lower connection plates 63a and 63b. The location of the convex portion 65 corresponds to a location of an oscillation-provision point in the up-and-down direction.

Positioning portions 66a and 66b are formed on two sides of the convex portion 65 in the up-and-down direction. Each of the positioning portions 66a and 66b is engaged with, or brought into contact with a specified portion on the front side of the oscillation providing mechanism 112a when the oscillation providing mechanism 112a is attached.

This makes it possible to easily attach (perform positioning with respect to) the oscillation providing mechanism 112a, and thus to facilitate an operation upon attachment. Further, this makes it possible to make the oscillation providing mechanism 112a more stable after the oscillation providing mechanism 112a is attached.

A specific configuration of the convex portion 65 is not limited, and any configuration that makes it possible to obtain the oscillation-provision-target surface 38 may be adopted. Further, with respect to a specific configuration of each of the positioning portions 66a and 66b, the positioning portions 66a and 66b may also be designed discretionarily.

In the present embodiment, the left frame 11c is made of aluminum. The convex portion 65 and the positioning portions 66a and 66b can also be formed integrally with, for example, the anterior portion 61 and the posterior portion 62.

As illustrated in FIG. 17B, in a direction in which the left frame 11c extends, the sound output region S is formed to include a location at which oscillation is provided by the oscillation providing mechanism 112a, that is, the convex portion 65.

As illustrated in FIG. 18, the sound output region S is set in the lateral face 61b of the anterior portion 61, and the sound output region S is configured to have a relatively small thickness, compared to a portion other than the sound output region S. In the present embodiment, with respect to the lateral face 61b having a thickness of 2 mm, processing of making the thickness smaller is performed from an internal side of the lateral face 61b to form the sound output region S having a thickness of 1 mm.

In the present embodiment, a length of the sound output region S in the up-and-down direction is set to be 210 mm. This makes it possible to provide a space with high-quality sound. Of course, the range is not limited to this.

With respect to one of (or all of) the front face 61a, the rear face 61c, and the plane portion 62a of the posterior portion 62 instead of, or in addition to the lateral face 61b, the processing of making the thickness smaller may be performed to form the sound output region S.

[Reproduction Control]

Figure 19:
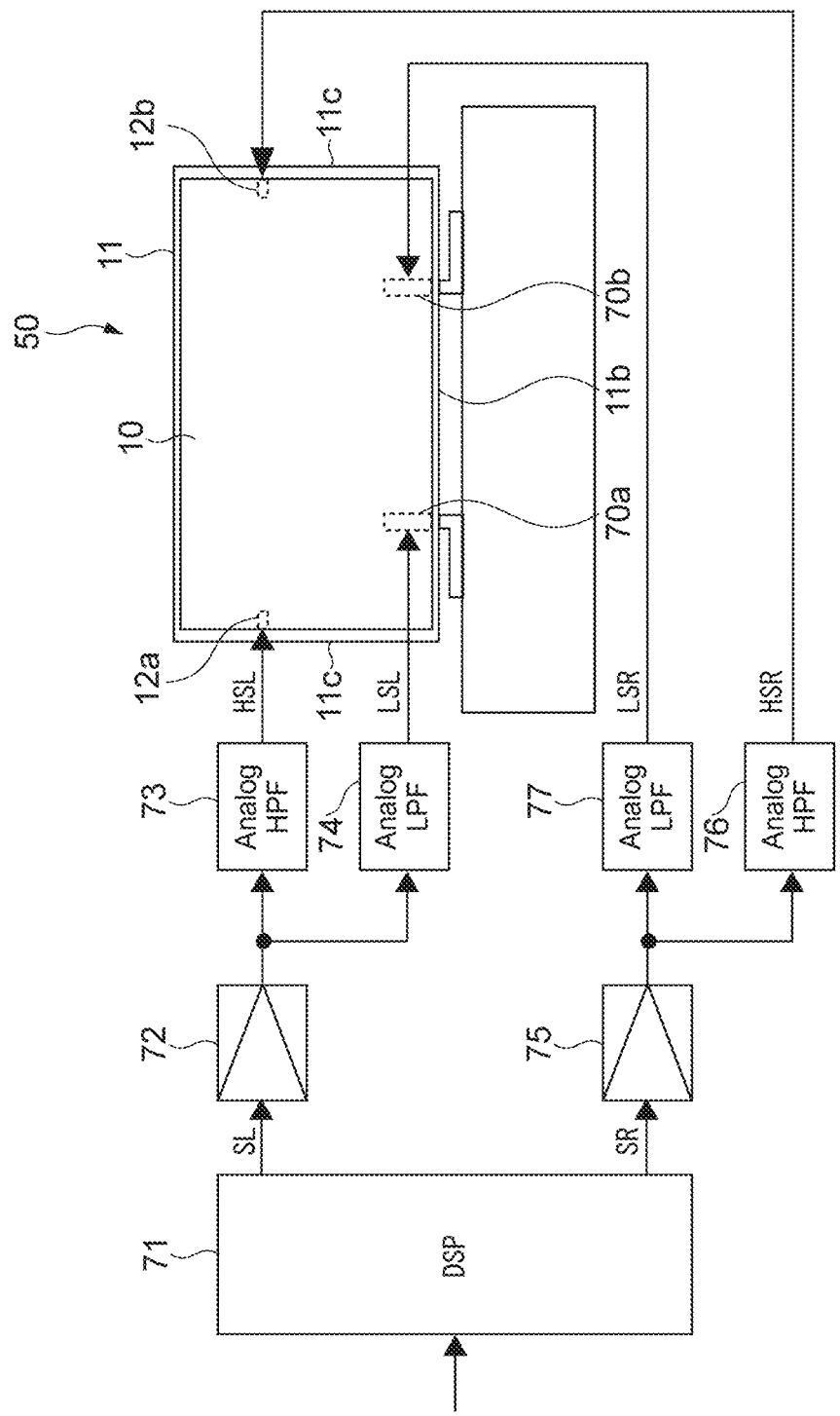
FIG. 19 is a schematic diagram used to describe an example of a sound-reproduction control.

FIG. 19 is a schematic diagram used to describe an example of a sound-reproduction control that is performed by the controller 13 included in the oscillation controller.

Here, an example in which the image display apparatus 50 illustrated in FIG. 1 further includes right and left low-midrange speakers 70a and 70b, is described. The low-midrange speakers 70a and 70b are arranged near the lower frame 11b.

A specific configuration of each of the low-midrange speakers 70a and 70b is not limited. For example, an ordinary speaker that includes, for example, a voice coil and a cone may be adopted.

A sound signal (such as a stereophonic-sound signal) that includes output-target sound information is supplied to a DSP 71 that is included in the oscillation controller. The sound signal may be supplied to the DSP 71 from an optical recording medium or a semiconductor memory, or the sound signal may be supplied to the DSP 71 from, for example, a network.

The DSP 71 performs digital-sound-signal processing, such as frequency correction, with respect to the supplied stereophonic-sound signal. After the digital-sound-signal processing is performed by the DSP 71, processing for converting a digital sound signal into an analog sound signal is performed by the DSP 71. As a result of performing the conversion processing, a left-channel sound signal SL and a right-channel sound signal SR that are analog sound signals are obtained.

The sound signal SL is supplied to a sound signal amplifying circuit 72.

After the sound signal SL is amplified by the sound signal amplifying circuit 72, the sound signal SL is supplied to an analog high-pass filter (HPF) 73 and an analog low-pass filter (LPF) 74.

The analog HPF 73 performs splitting on the sound signal SL to obtain a sound signal HSL that corresponds to a high-frequency component, and the analog LPF 74 performs splitting on the sound signal SL to obtain a sound signal LSL that corresponds to a low-midrange-frequency component.

The sound signal HSL is supplied to the oscillation providing mechanism 12a, and oscillation depending on the sound signal HSL is generated by the actuator 17. The generated oscillation is transmitted to the left frame 11c, and sound based on the sound signal HSL is reproduced from the left frame 11c.

The sound signal LSL is supplied to the low-midrange speaker 70a. Then, sound based on the sound signal LSL is reproduced from the low-midrange speaker 70a.

The sound signal SR is supplied to a sound signal amplifying circuit 75.

After the sound signal SR is amplified by the sound signal amplifying circuit 75, the sound signal SR is supplied to an analog high-pass filter (HPF) 76 and an analog low-pass filter (LPF) 77.

The analog HPF 76 performs splitting on the sound signal SR to obtain a sound signal HSR that corresponds to a high-frequency component, and the analog LPF 77 performs splitting on the sound signal SR to obtain a sound signal LSR that corresponds to a low-midrange-frequency component.

The sound signal HSR is supplied to the oscillation providing mechanism 12b, and oscillation depending on the sound signal HSR is generated by the actuator 17. The generated oscillation is transmitted to the right frame 11d, and sound based on the sound signal HSR is reproduced from the right frame 11d.

The sound signal LSR is supplied to the low-midrange speaker 70b. Then, sound based on the sound signal LSR is reproduced from the low-midrange speaker 70b.

Figure 20A:
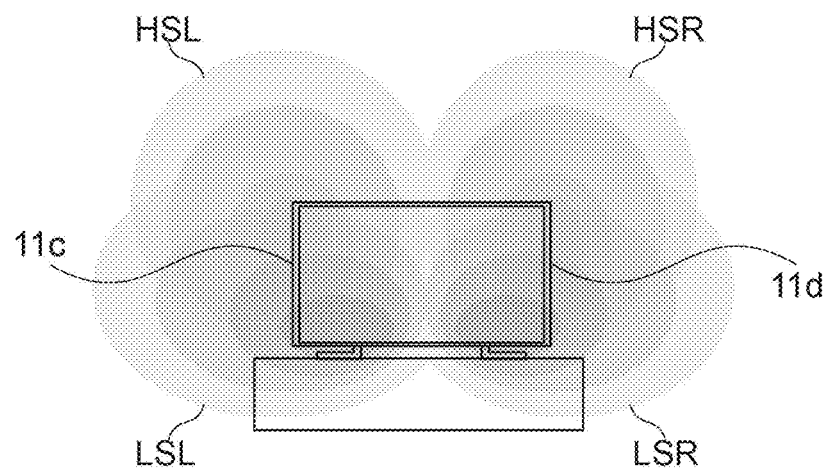
FIGS. 20A, 20B, and 20C schematically illustrate how high-frequency sounds and low-midrange-frequency sounds are output to be reproduced.
Figure 20B:
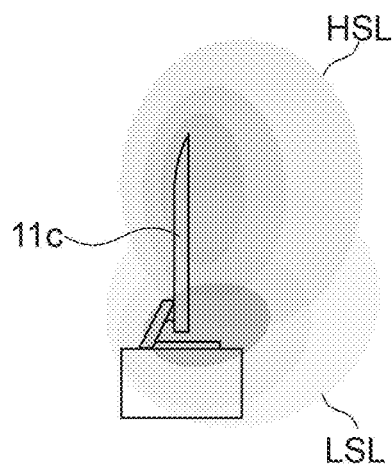
Figure 20C:
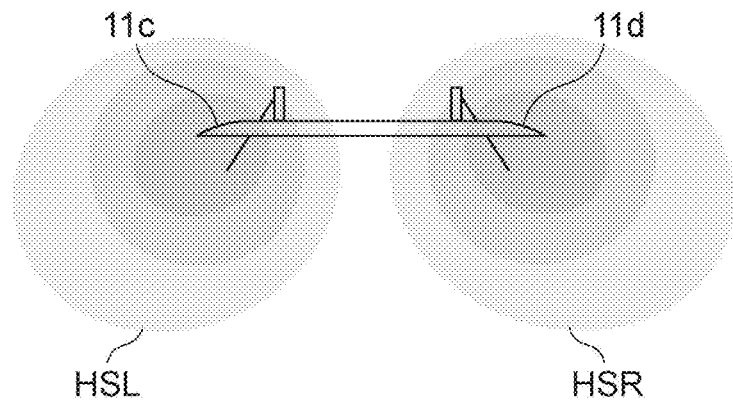

FIGS. 20A, 20B, and 20C schematically illustrate how high-frequency sounds HSL and HSR and low-midrange-frequency sounds LSL and LSR are output to be reproduced.

As illustrated in FIGS. 20A, 20B, and 20C, the left frame 11c and the right frame 11d themselves oscillate, and sound is emitted around the left frame 11c and the right frame 11d. This makes it possible to provide, to a viewer, a high-frequency sound with a higher level of spaciousness of sound perceived and a higher resolution. Further, it is possible to localize a sound image at a center portion, and to stabilize localization effects.

A phenomenon in which sound is heard from the right and the left can be prevented even if, for example, the image display apparatus 50 includes a large screen. In other words, it is possible to directly provide a high-frequency sound to a viewer who is viewing a video in front of the image display apparatus 50.

Further, in the left frame 11c and the right frame 11d, the sound output region S is designed as appropriate with respect to, for example, a location and a length of the sound output region S. This makes it possible to improve a level of spaciousness of sound perceived and localization effects. Further, it is possible to integrally provide a viewer with the high-frequency sounds HSL and HSR, and the low-midrange-frequency sounds LSL and LSR respectively being output from the low-midrange speakers 70a and 70b, without the high-frequency sounds HSL and HSR and the low-midrange-frequency sounds LSL and LSR being separated. This results in an environment of high-quality viewing.

A viewer can enjoy content (a piece of work) while feeling at one with a video with a large screen impact, and with sound with a higher level of spaciousness of sound perceived and a higher resolution from a high-frequency sound to a low-midrange-frequency sound.

The example in which the frame 11 and the oscillation providing mechanism 12 are used as a tweeter has been described in FIGS. 19, 20A, 20B, and 20C. Without being limited thereto, the present technology can be applied to output of sound in any range of frequency.

As described above, in the image display apparatus 50 according to the present embodiment, a member that is included in the functional mechanism performing an image display function is oscillated by the oscillation providing mechanism 12 as the oscillation-provision-target member 15. The oscillation providing mechanism 12 includes the support member 19 supporting the actuator 17. The support member 19 is biased by the biasing member 20 provided around the support member 19 toward the oscillation-provision-target member 15. Further, the oscillation-provision-target member 15 includes the sound output region S configured to have a relatively small thickness. Such a configuration makes it possible to make the apparatus thinner and smaller, and to provide a space with high-quality sound.

For example, a screen of a TV apparatus has been increasingly made larger, and at the same time, the entirety of the apparatus is desired to be thinner and smaller. The present technology can meet such a need.

Figure 21A:
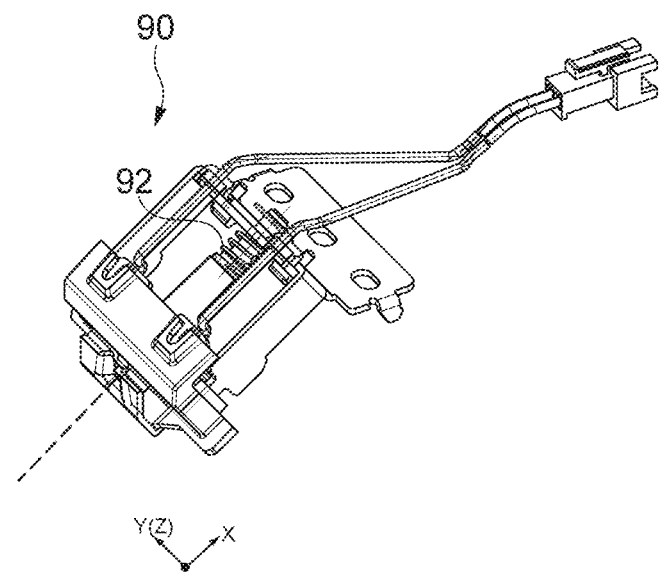
FIGS. 21A and 21B schematically illustrate an example of a configuration of an oscillation providing mechanism that is a comparative example.
Figure 21B:
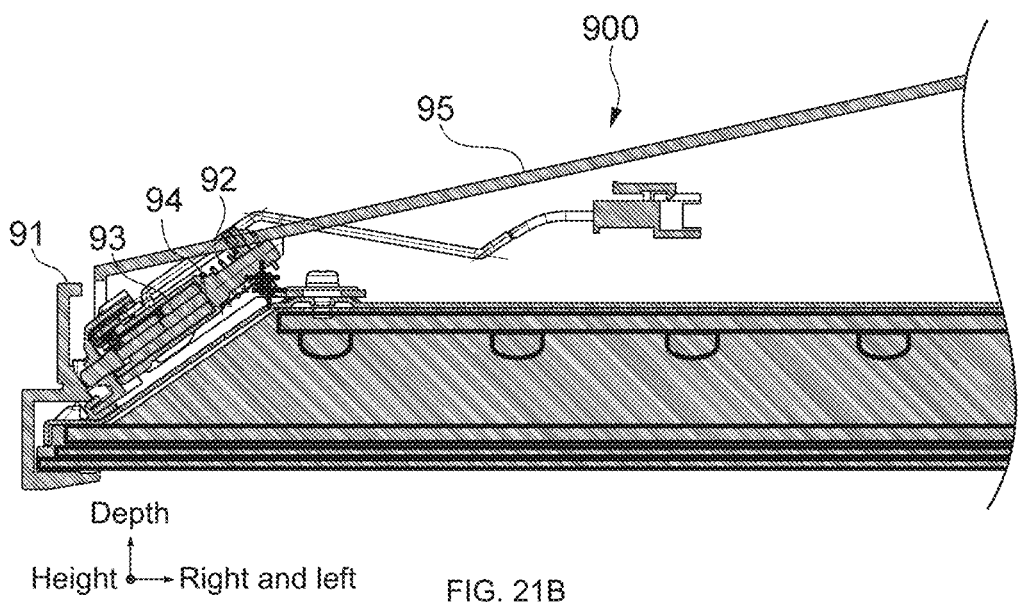

FIGS. 21A and 21B schematically illustrate an example of a configuration of an oscillation providing mechanism 90 that is a comparative example.

The oscillation providing mechanism 90 illustrated in FIGS. 21A and 21B can also directly oscillate a frame 91 of an image display apparatus 900 to output sound. This makes it possible to provide, to a viewer, a high-frequency sound with a higher level of spaciousness of sound perceived and a higher resolution. Further, it is possible to localize a sound image at a center portion, and to stabilize localization effects.

On the other hand, in the oscillation providing mechanism 90, a coil spring 92 is arranged further rearward (arranged further away from the frame 91) than a rear end 94 of an actuator 93 in the axial direction of the oscillation axis V. This makes it difficult to make the oscillation providing mechanism 90 smaller in size in the front-rear direction (the depth direction), and thus to make the oscillation providing mechanism 90 compact in size. This results in difficulty in making the image display apparatus 900 thinner and smaller.

When, for example, a configuration that is similar to the configuration of the image display apparatus 50 of FIG. 7, as illustrated in FIG. 21B, it is difficult to accommodate the oscillation providing mechanism 90 in a rear cover 95. In other words, the configuration in which the coil spring 92 is arranged further rearward than the actuator 93 results in difficulty in making an outer cover slimer.

Other Embodiments

The present technology is not limited to the embodiments described above, and can achieve various other embodiments.

Referring to FIGS. 2A and 2B, the oscillation providing mechanism 12 may be connected only to the fixation-side member 30 upon attaching the oscillation providing mechanism 12. Without being limited thereto, the oscillation providing mechanism 12 may be connected to a location that is different from an oscillation-provision point of the oscillation-provision-target member 15. In this state, oscillation may be provided to the oscillation-provision point. Of course, the oscillation providing mechanism 12 may be connected to both the fixation-side member 30 and the oscillation-provision-target member 15.

A reinforcement member or the like may be connected to the fixation-side member 30, and the fixation member of the oscillation providing mechanism 12 may be connected to the reinforcing member.

Moreover, a configuration and a method for attaching the oscillation providing mechanism 12 is not limited, and designing may be performed discretionarily.

The function of the functional mechanism is not limited to an image display function. Further, the function is not limited to a function performed with an electrical control. For example, the present technology can be applied to a functional mechanism, such as a sensing function, a temperature adjusting mechanism, and a lighting adjusting function, that performs any function.

For example, the oscillation providing mechanism according to the present technology is attached to a picture frame or the like used to hold, for example, a painting. Then, sound is output by oscillating the picture frame or the like. Such a configuration makes it possible to achieve an embodiment of the sound output apparatus according to the present technology. Note that the picture frame or the like can be considered a functional mechanism that performs a function of holding, for example, a painting.

The respective configurations of the image display apparatus, the respective members included in the image display apparatus, the oscillation providing mechanism, the respective members included in the oscillation providing mechanism, and the like; the sound-production control; and the like described with reference to the respective figures are merely embodiments, and any modifications may be made thereto without departing from the spirit of the present technology. In other words, for example, any other configurations and any other algorithms for purpose of practicing the present technology may be adopted.

In the description above, the wording such as "substantially" or "about" has been used as appropriate to describe, for example, a shape. Such wording is merely used to facilitate the understanding of the description, and whether the wording such as "substantially" or "about" is used has no particular significance.

In other words, in the present disclosure, expressions, such as "center", "middle", "uniform", "equal", "same", "orthogonal", "parallel", "symmetric", "extend/extension", "axial direction", "columnar", "cylindrical (shape)", "ring-shaped", and "annular" that define, for example, a shape, a size, a positional relationship, and a state respectively include, in concept, expressions such as "substantially the center/substantial center", "substantially the middle/substantially middle", "substantially uniform", "substantially equal", "substantially the same", "substantially orthogonal", "substantially parallel", "substantially symmetric", "substantially extend/substantial extension", "substantially axial direction", "substantially columnar", "substantially cylindrical (shape)", "substantially ring-shaped", and "substantially annular".

For example, the expressions such as "center", "middle", "uniform", "equal", "same", "orthogonal", "parallel", "symmetric", "extend/extension", "axial direction", "columnar", "cylindrical (shape)", "ring-shaped", and "annular" also respectively include states within specified ranges (such as a range of +/−10%), with expressions such as "exactly the center/exact center", "exactly the middle/exactly middle", "exactly uniform", "exactly equal", "exactly the same", "completely orthogonal", "completely parallel", "completely symmetric", "completely extend/complete extension", "fully axial direction", "perfectly columnar", "perfectly cylindrical (shape)", "perfectly ring-shaped", and "perfectly annular" being respectively used as references.

Thus, an expression that does not include the wording such as "substantially" or "about" can also include, in concept, an expression including the wording such as "substantially" or "about". Conversely, a state expressed using the expression including the wording such as "substantially" or "about" may include a state of "exactly/exact", "completely", "fully", or "perfectly".

At least two of the features of the present technology described above can also be combined. In other words, the various features described in the respective embodiments may be combined discretionarily regardless of the embodiments. Further, the various effects described above are not limitative but are merely illustrative, and other effects may be provided.

Note that the present technology may also take the following configurations.

(1) A sound output apparatus, including:
a functional mechanism that performs a specified function;
an oscillation providing mechanism that oscillates, as an oscillation-provision-target member, a member that is included in the functional mechanism; and
an oscillation controller that controls an oscillation operation performed by the oscillation providing mechanism, on the basis of sound information,
the oscillation providing mechanism including
an actuator that generates oscillation along a specified oscillation axis, and includes a rear end that is situated opposite to the oscillation-provision-target member in an axial direction of the oscillation axis,
a support member that supports the actuator, and
a biasing member that is provided around the support member as viewed along the oscillation axis and of which at least a portion is arranged closer to the oscillation-provision-target member than the rear end of the actuator in the axial direction of the oscillation axis, the biasing member biasing the support member toward the oscillation-provision-target member,
the oscillation-provision-target member including a sound output region being configured to have a relatively small thickness.

(2) The sound output apparatus according to (1), in which
the entirety of the biasing member is arranged closer to the oscillation-provision-target member than the rear end of the actuator in the axial direction of the oscillation axis.

(3) The sound output apparatus according to (1) or (2), in which
the functional mechanism is capable of performing an image display function,
the functional mechanism includes a display panel and a frame that supports the display panel, and
the oscillation-provision-target member is the frame included in the functional mechanism.

(4) The sound output apparatus according to (3), in which
the frame has a shape that extends in a certain direction, and
a region that has a specified length in the direction of the extension is configured as the sound output region.

(5) The sound output apparatus according to (4), in which
the sound output region is configured to include, in the direction of the extension of the frame, a location at which oscillation is provided by the oscillation providing mechanism.

(6) The sound output apparatus according to any one of (3) to (5), in which
the oscillation-provision-target members are a left frame and a right frame, the left frame supporting a left edge of the display panel when the display panel is viewed from the front, the right frame supporting a right edge of the display panel when the display panel is viewed from the front.

(7) The sound output apparatus according to any one of (3) to (6), in which
the functional mechanism includes a back chassis, and
the oscillation providing mechanism is fixed to the back chassis.

(8) The sound output apparatus according to any one of (1) to (7), in which
the oscillation-provision-target member is a member that is indispensable when the functional mechanism performs the specified function.

(9) The sound output apparatus according to any one of (1) to (8), in which
the oscillation providing mechanism includes a contact member that is connected to the actuator, and is brought into contact with the oscillation-provision-target member.

(10) The sound output apparatus according to any one of (1) to (8), in which
the oscillation providing mechanism includes a fixation member that is used to fix the support member to the functional mechanism.

(11) The sound output apparatus according to any one of (1) to (10), in which the biasing member is a coil spring that is arranged around the support member.

(12) The sound output apparatus according to any one of (1) to (11), in which
the actuator includes a piezoelectric element or a dielectric elastomer.

(13) The sound output apparatus according to any one of (1) to (12), in which
the support member is hollow, and accommodates therein the actuator.

(14) The sound output apparatus according to any one of (1) to (13), in which
the support member is a die-cast member or a press member.

(15) An oscillation providing mechanism that oscillates an oscillation-provision-target member, the oscillation providing mechanism including:
an actuator that generates oscillation along a specified oscillation axis, and includes a rear end that is situated opposite to the oscillation-provision-target member in an axial direction of the oscillation axis;
a support member that supports the actuator; and
a biasing member that is provided around the support member as viewed along the oscillation axis and of which at least a portion is arranged closer to the oscillation-provision-target member than the rear end of the actuator in the axial direction of the oscillation axis, the biasing member biasing the support member toward the oscillation-provision-target member.

REFERENCE SIGNS LIST

S sound output region
V oscillation axis
10 display panel
11 (11a to 11d) frame
12 (12a, 12b), 112a, 112b oscillation providing mechanism
13 controller
15 oscillation-provision-target member
17, 117 actuator
18, 118 contact member
19 support member
20, 120 biasing member (coil spring)
21, 121 fixation member
23a, 23b piezoelectric element
25, 125 rear end
36 back chassis
37 rear cover
38 oscillation-provision-target surface
50 image display apparatus
71 DSP
151 body
152 cover
153 case portion

The invention claimed is:
1. A sound output apparatus, comprising:
a functional mechanism configured to perform a specified function;
an oscillation providing mechanism configured to oscillate, as an oscillation-provision-target member, a member that is included in the functional mechanism; and
an oscillation controller configured to control oscillation generated by the oscillation providing mechanism based on a basis of sound information, wherein the oscillation providing mechanism includes:
an actuator configured to generate the oscillation along a specified oscillation axis,
wherein the actuator includes a rear end that is situated opposite to the oscillation-provision-target member in an axial direction of the specified oscillation axis,
a support member configured to support the actuator, and
a biasing member which is a coil spring wrapped around
the support member as viewed along the specified oscillation axis,
wherein
at least a portion of the biasing member is closer to the oscillation-provision-target member than the rear end of the actuator in the axial direction of the specified oscillation axis,
the biasing member is configured to bias the support member towards the oscillation-provision-target member,
the oscillation-provision-target member is configured to include a sound output region and a region other than the sound output region,
the sound output region is configured to output sound based on the oscillation, and
thickness of the sound output region is smaller than a thickness of the region other than the sound output region.

2. The sound output apparatus according to claim 1, wherein the entirety of the biasing member is arranged closer to the oscillation-provision-target member than the rear end of the actuator in the axial direction of the specified oscillation axis.

3. The sound output apparatus according to claim 1, wherein
the specified function is an image display function,
the functional mechanism includes a display panel and a frame that supports the display panel, and
the oscillation-provision-target member is the frame included in the functional mechanism.

4. The sound output apparatus according to claim 3, wherein
the frame has a shape that extends in a specific direction, and
the sound output region has a specified length in the specific direction of the extension.

5. The sound output apparatus according to claim 4, wherein the sound output region is further configured to include, in the specific direction of the extension of the frame, a location at which the oscillation is provided by the oscillation providing mechanism.

6. The sound output apparatus according to claim 3, wherein
the oscillation-provision-target member is further configured to include a left frame and a right frame,
the left frame is configured to support a left edge of the display panel when the display panel is viewed from a front direction from the axial direction of the specified oscillation axis, and
the right frame is configured to support a right edge of the display panel when the display panel is viewed from the front direction.

7. The sound output apparatus according to claim 3, wherein
the functional mechanism includes a back chassis, and
the oscillation providing mechanism is fixed to the back chassis.

8. The sound output apparatus according to claim 1, wherein the oscillation-provision-target member is indispensable when the functional mechanism performs the specified function.

9. The sound output apparatus according to claim 1, wherein
the oscillation providing mechanism further includes a contact member that is connected to the actuator, and
the contact member is configured to come into contact with the oscillation-provision-target member.

10. The sound output apparatus according to claim 1, wherein the oscillation providing mechanism further includes a fixation member that is used to fix the support member to the functional mechanism.

11. The sound output apparatus according to claim 1, wherein the actuator includes one of a piezoelectric element or a dielectric elastomer.

12. The sound output apparatus according to claim 1, wherein
the support member is hollow, and
the support member is configured to accommodate the actuator.

13. The sound output apparatus according to claim 1, wherein the support member is at least one of a die-cast member or a press member.

14. An oscillation providing mechanism that oscillates an oscillation-provision-target member, the oscillation providing mechanism comprising:
an actuator configured to generate that generates oscillation along a specified oscillation axis,
wherein the actuator includes a rear end that is situated opposite to the oscillation-provision-target member in an axial direction of the specified oscillation axis;
a support member configured to support the actuator; and
a biasing member which is a coil spring wrapped around the support member as viewed along the specified oscillation axis,
wherein
at least a portion of the biasing member is closer to the oscillation-provision-target member than the rear end of the actuator in the axial direction of the specified oscillation axis, and
the biasing member is configured to bias the support member towards the oscillation-provision-target member.

* * * * *